United States Patent
Akpala

(10) Patent No.: US 10,380,656 B2
(45) Date of Patent: Aug. 13, 2019

(54) DYNAMIC PREDEFINED PRODUCT REVIEWS

(71) Applicant: eBay Inc., San Jose, CA (US)

(72) Inventor: Romi Akpala, San Jose, CA (US)

(73) Assignee: eBay Inc., San Jose, CA (US)

(*) Notice: Subject to any disclaimer, the term of this patent is extended or adjusted under 35 U.S.C. 154(b) by 663 days.

(21) Appl. No.: 14/633,938

(22) Filed: Feb. 27, 2015

(65) Prior Publication Data

US 2016/0253719 A1  Sep. 1, 2016

(51) Int. Cl.
*G06Q 30/02* (2012.01)

(52) U.S. Cl.
CPC .................. *G06Q 30/0282* (2013.01)

(58) Field of Classification Search
CPC ............................ G06Q 30/00; G06Q 30/0282
USPC ......................................................... 705/347
See application file for complete search history.

(56) References Cited

U.S. PATENT DOCUMENTS

| | | |
|---|---|---|
| 5,285,496 A | 2/1994 | Frank et al. |
| 5,416,903 A | 5/1995 | Malcolm |
| 5,583,763 A | 12/1996 | Atcheson et al. |
| 5,596,994 A | 1/1997 | Bro |
| 5,659,366 A | 8/1997 | Kerman |
| 5,669,877 A | 9/1997 | Blomquist |
| 5,678,041 A | 10/1997 | Baker et al. |
| 5,706,493 A | 1/1998 | Sheppard, II |
| 5,706,507 A | 1/1998 | Schloss |
| 5,708,829 A | 1/1998 | Kadashevich et al. |
| 5,722,418 A | 3/1998 | Bro |
| 5,732,954 A | 3/1998 | Strickler et al. |
| 5,737,479 A | 4/1998 | Fujinami |
| 5,754,939 A | 5/1998 | Herz et al. |
| 5,774,121 A | 6/1998 | Stiegler |
| 5,778,135 A | 7/1998 | Otteson et al. |
| 5,781,246 A | 7/1998 | Alten et al. |
| 5,787,253 A | 7/1998 | McCreery et al. |
| 5,790,426 A | 8/1998 | Robinson |
| 5,793,027 A | 8/1998 | Baik |
| 5,799,304 A | 8/1998 | Miller |

(Continued)

FOREIGN PATENT DOCUMENTS

| | | |
|---|---|---|
| WO | WO-03010621 A2 | 2/2003 |
| WO | WO-2003010621 A3 | 2/2003 |
| WO | WO-2016138097 A1 | 9/2016 |

OTHER PUBLICATIONS

Beal, Vangie, "The History of Microsoft Operating Systems," Webopedia, [online], archived on Jun. 9, 2012, available at: <https://web.archive.org/web/20120609115126/https://www.webopedia.com/DidYouKnow/Hardware_Software/history_of_microsoft_windows_operating_system.html > (Year: 2012).*

(Continued)

*Primary Examiner* — Dennis W Ruhl
*Assistant Examiner* — Richard W. Crandall
(74) *Attorney, Agent, or Firm* — Schwegman Lundberg & Woessner, P.A.

(57) ABSTRACT

In an example embodiment, user feedback on a purchased item is received from a user. Attributes of the purchased item are identified. Then relevant attributes are determined from the attributes, the determination of relevant attributes being based on user information regarding the user. Comments for the relevant attributes are generated based on the user feedback. The comments are then displayed to the user for selection and posting.

22 Claims, 16 Drawing Sheets

(56) References Cited

U.S. PATENT DOCUMENTS

| | | | |
|---|---|---|---|
| 5,809,482 A | 9/1998 | Strisower | |
| 5,810,771 A | 9/1998 | Blomquist | |
| 5,822,123 A | 10/1998 | Davis et al. | |
| 5,828,419 A | 10/1998 | Bruette et al. | |
| 5,830,068 A | 11/1998 | Brenner et al. | |
| 5,832,472 A | 11/1998 | Sheppard, II | |
| 5,845,266 A | 12/1998 | Lupien et al. | |
| 5,848,396 A | 12/1998 | Gerace | |
| 5,862,230 A | 1/1999 | Darby | |
| 5,867,799 A | 2/1999 | Lang et al. | |
| 5,870,744 A | 2/1999 | Sprague | |
| 5,872,850 A | 2/1999 | Klein et al. | |
| 5,905,974 A | 5/1999 | Fraser et al. | |
| 5,924,072 A | 7/1999 | Havens | |
| 5,926,794 A | 7/1999 | Fethe | |
| 5,944,790 A | 8/1999 | Levy | |
| 5,970,469 A | 10/1999 | Scroggie et al. | |
| 5,974,412 A | 10/1999 | Hazlehurst et al. | |
| 5,991,739 A | 11/1999 | Cupps et al. | |
| 6,029,141 A | 2/2000 | Bezos et al. | |
| 6,044,363 A | 3/2000 | Mori et al. | |
| 6,055,518 A | 4/2000 | Franklin et al. | |
| 6,058,417 A | 5/2000 | Hess et al. | |
| 6,066,075 A | 5/2000 | Poulton | |
| 6,070,145 A | 5/2000 | Pinsley et al. | |
| 6,073,117 A | 6/2000 | Oyanagi et al. | |
| 6,119,078 A | 9/2000 | Kabayakawa et al. | |
| 6,122,666 A | 9/2000 | Beurket et al. | |
| 6,134,548 A | 10/2000 | Gottsman | |
| 6,161,099 A | 12/2000 | Harrington et al. | |
| 6,189,029 B1 | 2/2001 | Fuerst | |
| 6,199,049 B1 | 3/2001 | Conde et al. | |
| 6,202,051 B1 | 3/2001 | Woolston | |
| 6,216,539 B1 | 4/2001 | Johnson et al. | |
| 6,236,975 B1 | 5/2001 | Boe et al. | |
| 6,266,649 B1 | 7/2001 | Linden et al. | |
| 6,292,769 B1 | 9/2001 | Flanagan et al. | |
| 6,311,190 B1 | 10/2001 | Bayer et al. | |
| 6,327,574 B1 | 12/2001 | Kramer et al. | |
| 6,415,270 B1 | 7/2002 | Rackson et al. | |
| 6,484,153 B1 | 11/2002 | Walker et al. | |
| 6,505,201 B1 | 1/2003 | Haitsuka et al. | |
| 6,523,037 B1 | 2/2003 | Monahan et al. | |
| 6,539,392 B1 | 3/2003 | Rebane | |
| 6,606,581 B1 | 8/2003 | Nickerson et al. | |
| 6,697,824 B1 | 2/2004 | Bowman-Amuah | |
| 6,963,848 B1 | 11/2005 | Brinkerhoff | |
| 7,024,383 B1 | 4/2006 | Mancini et al. | |
| 7,031,952 B1 | 4/2006 | Heumann et al. | |
| 7,065,494 B1* | 6/2006 | Evans | G06Q 10/06393 370/248 |
| 7,096,193 B1 | 8/2006 | Beaudoin et al. | |
| 7,840,448 B2 | 11/2010 | Musgrove et al. | |
| 7,885,863 B2 | 2/2011 | Ojakaar et al. | |
| 9,015,585 B2 | 4/2015 | Boone | |
| 9,256,894 B2 | 2/2016 | Murthy et al. | |
| 9,607,325 B1* | 3/2017 | Sriram | G06Q 30/0282 |
| 2001/0029455 A1 | 10/2001 | Chin et al. | |
| 2001/0037206 A1 | 11/2001 | Falk et al. | |
| 2001/0037253 A1 | 11/2001 | Kensey | |
| 2002/0007338 A1 | 1/2002 | Do et al. | |
| 2002/0078152 A1* | 6/2002 | Boone | G06Q 10/10 709/204 |
| 2003/0014318 A1 | 1/2003 | De La Motte et al. | |
| 2003/0167209 A1 | 9/2003 | Hsieh | |
| 2007/0244888 A1* | 10/2007 | Chea | G06F 17/30861 |
| 2008/0071602 A1* | 3/2008 | Ojakaar | G06Q 30/02 705/14.44 |
| 2009/0063247 A1* | 3/2009 | Burgess | G06Q 30/02 705/7.34 |
| 2010/0037166 A1* | 2/2010 | Chandrasekar | G06F 3/0481 715/769 |
| 2010/0169317 A1 | 7/2010 | Wang et al. | |
| 2011/0004508 A1 | 1/2011 | Huang et al. | |
| 2011/0251973 A1* | 10/2011 | Chen | G06F 17/30864 705/347 |
| 2012/0323928 A1* | 12/2012 | Bhatia | G06F 17/30528 707/748 |
| 2013/0111364 A1 | 5/2013 | Boone et al. | |
| 2013/0311395 A1* | 11/2013 | Bohra | G06Q 30/00 705/347 |
| 2015/0186790 A1* | 7/2015 | Ehlen | G06F 17/3053 706/52 |
| 2015/0227990 A1 | 8/2015 | Boone et al. | |
| 2015/0356640 A1* | 12/2015 | Flores | G06Q 30/0625 705/26.62 |
| 2016/0232581 A1 | 8/2016 | Boone et al. | |

OTHER PUBLICATIONS

"U.S. Appl. No. 15/018,650, First Action Interview-Pre-Interview Communication dated Aug. 25, 2016", 3 pgs.

"U.S. Appl. No. 15/018,650, Non Final Office Action dated Mar. 24, 2017", 5 pgs.

"U.S. Appl. No. 15/018,650, Response filed Sep. 26, 2016 to First Action Pre-Interview Communication dated Aug. 25, 2016", 7 pgs.

U.S. Appl. No. 09/740,502, filed Dec. 19, 2000, Method and Apparatus for Providing Predefined Feedback.

U.S. Appl. No. 13/722,739, U.S. Pat. No. 9,015,585, filed Dec. 20, 2012, Method and Apparatus for Providing Predefined Feedback.

U.S. Appl. No. 14/690,635, U.S. Pat. No. 9,256,894, filed Apr. 20, 2015, Method and Apparatus for Providing Predefined Feedback.

U.S. Appl. No. 15/018,650, filed Feb. 8, 2016, Method and Apparatus for Providing Predefined Feedback.

"U.S. Appl. No. 15/018,650, Response filed Jul. 24, 2017 to Non Final Office Action dated Mar. 24, 2017", 27 pgs.

"U.S. Appl. No. 15/018,650, Notice of Allowance dated Aug. 24, 2017", 10 pgs.

"International Application Serial No. PCT/US2016/019294, International Preliminary Report on Patentability dated Sep. 8, 2017", 6 pgs.

"U.S. Appl. No. 09/740,502, Notice of Non-Responsive Amendment dated Dec. 7, 2012", 6 pgs.

"U.S. Appl. No. 09/740,502, Advisory Action dated Apr. 24, 2006", 4 pgs.

"U.S. Appl. No. 09/740,502, Advisory Action dated Jul. 19, 2007", 4 pgs.

"U.S. Appl. No. 09/740,502, Examiner Interview Summary dated Mar. 17, 2008", 2 pgs.

"U.S. Appl. No. 09/740,502, Final Office Action dated Jan. 4, 2010", 16 pgs.

"U.S. Appl. No. 09/740,502, Final Office Action dated Jan. 14, 2009", 14 pgs.

"U.S. Appl. No. 09/740,502, Final Office Action dated Jan. 27, 2006", 23 pgs.

"U.S. Appl. No. 09/740,502, Final Office Action dated Mar. 2, 2005", 23 pgs.

"U.S. Appl. No. 09/740,502, Final Office Action dated Apr. 19, 2007", 12 pgs.

"U.S. Appl. No. 09/740,502, Non Final Office Action dated Aug. 8, 2005", 23 pgs.

"U.S. Appl. No. 09/740,502, Non Final Office Action dated Sep. 16, 2004", 21 pgs.

"U.S. Appl. No. 09/740,502, Non Final Office Action dated Oct. 19, 2006", 12 pgs.

"U.S. Appl. No. 09/740,502, Non-Final Office Action dated Jan. 4, 2008", 12 pgs.

"U.S. Appl. No. 09/740,502, Non-Final Office Action dated Jun. 10, 2009", 15 pgs.

"U.S. Appl. No. 09/740,502, Non-Final Office Action dated Jul. 31, 2008", 13 pgs.

"U.S. Appl. No. 09/740,502, Preliminary Amendment filed Apr. 28, 2003", 14 pgs.

"U.S. Appl. No. 09/740,502, Preliminary Amendment dated Dec. 2, 2003", 20 pgs.

"U.S. Appl. No. 09/740,502, Response filed Jan. 23, 2007 to Non-Final Office Action dated Oct. 19, 2006", 11 pgs.

(56) References Cited

OTHER PUBLICATIONS

"U.S. Appl. No. 09/740,502, Response filed Mar. 4, 2010 to Final Office Action dated Jan. 4, 2010", 13 pgs.
"U.S. Appl. No. 09/740,502, Response filed Mar. 16, 2009 to Final Office Action dated Jan. 14, 2009", 12 pgs.
"U.S. Appl. No. 09/740,502, Response filed Mar. 24, 2008 to Non-Final Office Action dated Jan. 4, 2008", 9 pgs.
"U.S. Appl. No. 09/740,502, Response filed Mar. 27, 2006 to Final Office Action dated Jan. 27, 2006", 24 pgs.
"U.S. Appl. No. 09/740,502, Response filed May 2, 2005 to Final Office Action dated Mar. 2, 2005", 22 pgs.
"U.S. Appl. No. 09/740,502, Response filed Jul. 5, 2007 to Final Office Action dated Apr. 19, 2007", 5 pgs.
"U.S. Appl. No. 09/740,502, Response filed Sep. 10, 2009 to Non Final Office Action dated Jun. 10, 2009", 13 pgs.
"U.S. Appl. No. 09/740,502, Response filed Oct. 22, 2007 to Final Office Action dated Apr. 19, 2007", 10 pgs.
"U.S. Appl. No. 09/740,502, Response filed Oct. 30, 2008 to Non-Final Office Action dated Jul. 31, 2008", 17 pgs.
"U.S. Appl. No. 09/740,502, Response filed Nov. 8, 2005 to Non Final Office Action dated Aug. 8, 2005", 27 pgs.
"U.S. Appl. No. 09/740,502, Response filed Dec. 16, 2004 Non-Final Office Action dated Sep. 16, 2004", 25 pgs.
"U.S. Appl. No. 13/722,739, Notice of Allowance dated Aug. 29, 2014", 9 pgs.
"U.S. Appl. No. 13/722,739, Notice of Allowance dated Dec. 22, 2014", 5 pgs.
"U.S. Appl. No. 14/690,635, Notice of Allowance dated Sep. 23, 2015", 12 pgs.
"U.S. Appl. No. 14/690,635, Pre-Interview First Office Action dated Jul. 15, 2015", 4 pgs.
"U.S. Appl. No. 14/690,635, Preliminary Amendment filed Apr. 23, 2015", 6 pgs.
"U.S. Appl. No. 14/690,635, Preliminary Amendment filed May 13, 2015", 7 pgs.
"U.S. Appl. No. 14/690,635, Response to Pre-Interview First Office Action filed Sep. 15, 2015", 8 pgs.
"U.S. Appl. No. 15/018,650, Preliminary Amendment filed Feb. 22, 2016", 7 pgs.
"Chinese Application Serial No. 01822389.3, Office Action dated Mar. 9, 2007", with English translation of claims, 9 pgs.
"Chinese Application Serial No. 01822389.3, Response filed Jul. 24, 2007 to Office Action dated Mar. 9, 2007", with English translation of claims, 19 pgs.
"EP Application Serial No. 01274337.3, Written Submission filed Oct. 4, 2012 to EP Summons to Attend Oral Proceedings dated Jul. 23, 2012", 16 pgs.
"European Application Serial No. 01274337.3, Decision to Refuse dated Apr. 8, 2013", 12 pgs.
"European Application Serial No. 01274337.3, European Search Report dated Nov. 15, 2005", 2 pgs.
"European Application Serial No. 01274337.3, Office Action dated Feb. 13, 2009", 4 pgs.
"European Application Serial No. 01274337.3, Response filed Apr. 24, 2009 to Office Action dated Feb. 13, 2009", 37 pgs.
"European Application Serial No. 01274337.3, Summons to Attend Oral Proceedings dated Jul. 23, 2012", 8 pgs.
"International Application Serial No. PCT/US01/50499, International Preliminary Examination Report dated Dec. 3, 2004", 4 pgs.
"International Application Serial No. PCT/US01/50499, International Search Report dated Apr. 23, 2004", 2 pgs.
"International Application Serial No. PCT/US01/50499, Written Opinion dated Nov. 3, 2004", 5 pgs.
"International Application Serial No. PCT/US2016/019294, International Search Report dated May 3, 2016", 2 pgs.
"International Application Serial No. PCT/US2016/019294, Written Opinion dated May 3, 2016", 6 pgs.
"Leave Feedback about a eBay User", Retrieved on Jan. 20, 2006 from wayback machine, [Online]. Retrieved from the Internet: <URL: http://web.archive.org/web/19990825071501/cgi2.ebay.com/aw-cgi/eBayISAPI.dll>, (Nov. 10, 1999), 5 pgs.
Meade, J., "Visual 360: A Performance Appraisal System That's 'Fun'", HR Magazine, Society for Human Resource Management, (Jul. 1999), 3 pgs.
Resnick, Paul, "Reputation systems", Communications of the ACM, 43(12), (Dec. 2000), 45-48.

* cited by examiner

US 10,380,656 B2

DYNAMIC PREDEFINED PRODUCT REVIEWS

TECHNICAL FIELD

This application relates generally to the dynamic generation of information by a computer system. More specifically, this application relates to dynamic generation or selection of predefined product reviews.

BACKGROUND

Consumers are shopping online for a growing variety of products and services and may conduct searches to locate items that are available for purchase or to access information regarding the items. Many consumers trust reviews from other consumers more than any other type of review, but it can be difficult to motivate consumers to review items they have purchased due to the effort involved in creating and posting the review. This problem is exacerbated by the rise of mobile devices, which often have small screens and/or keyboards (usually built into the screens) and thus are more difficult to type on. As a result, reviews can be skewed towards the extremes. Generally, consumers who either really love a product or really hate a product are the most likely to post reviews and, as such, reviews can be dominated by 5-star and 1-star reviews (on a scale of 1 to 5 stars). Making the review process less time and thought intensive for consumers will increase the number of reviews and ultimately aid in providing a more representative sample of consumer opinion.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, predefined product reviews can be dynamically generated and provided to consumers. The consumers can then accept or modify the predefined product reviews, making the review process much less time consuming for users. As will be described in detail below, the product reviews can be generated on-the-fly using a number of different factors.

Figure 1:
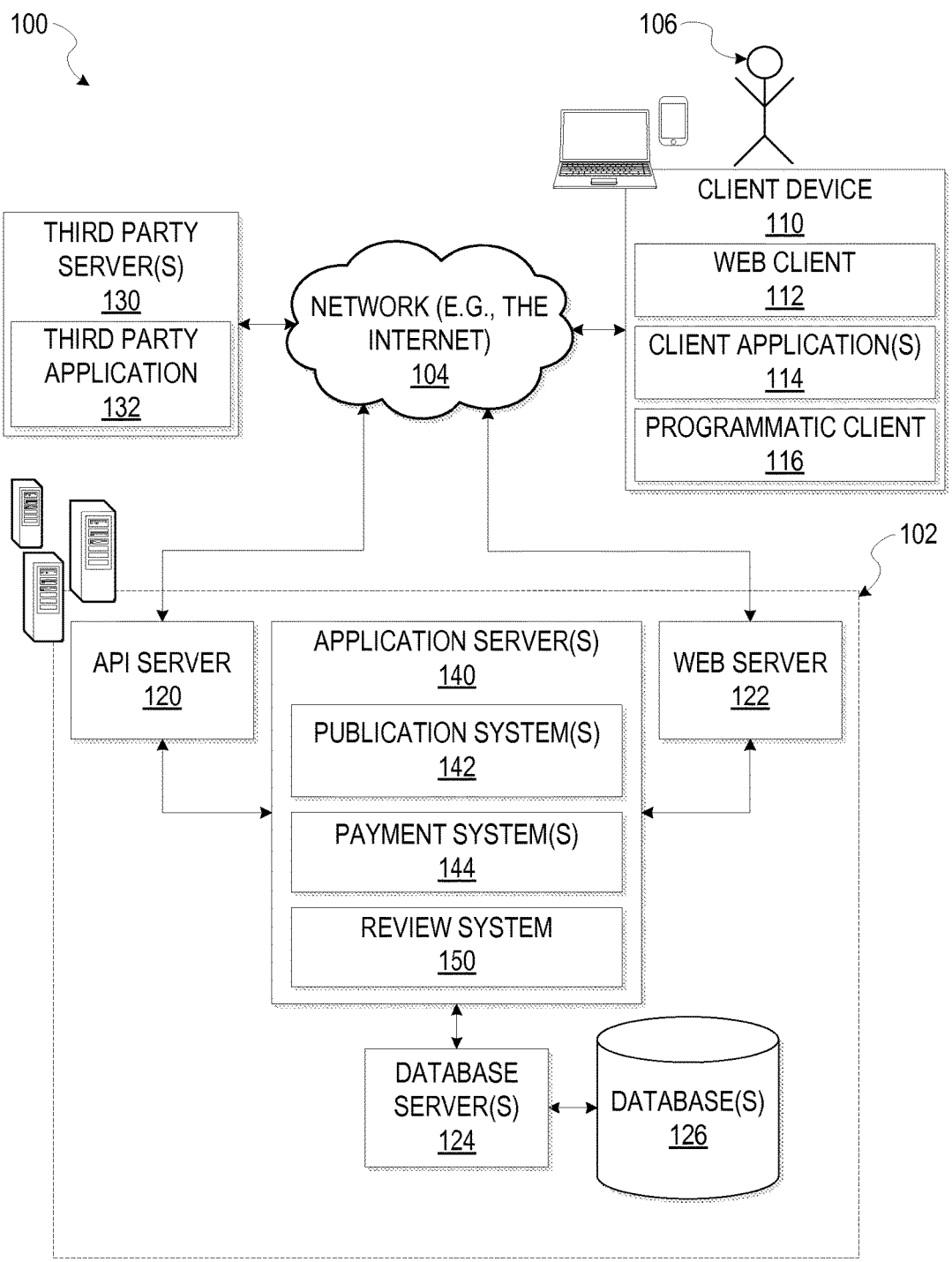
FIG. 1 is a block diagram illustrating a networked system, according to some example embodiments.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), an application 114, and a programmatic client 116 executing on client device 110.

The client device 110 may comprise, but is not limited to, a mobile phone, desktop computer, laptop, portable digital assistant (PDA), smart phone, tablet, ultra book, netbook, laptop, multi-processor system, microprocessor-based or programmable consumer electronics, game console, set-top box, or any other communication device that a user may utilize to access the networked system 102. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

Each of the client device 110 may include one or more applications 114 (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user 106, to verify a method of payment, etc.). Conversely, if the e-commerce site application is not included in the client device 110, the client device 110 may use its web browser to access the e-commerce site (or a variant thereof) hosted on the networked system 102.

In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The review system 150 may provide functionality operable to perform various review functions using the user selected data. For example, the review system 150 may access the user selected data from the databases 126, the third party servers 130, the publication system 142, and other sources. In some example embodiments, the review system 150 may analyze the user data to generate preprogrammed comments for reviews of items for sale in listings in the publication system 142. As more content is added to a category by the user 106, the review system 150 can further refine the reviews. In some example embodiments, the review system 150 may communicate with the publication systems 142 (e.g., accessing item listings) and payment system 144. In an alternative embodiment, the review system 150 may be a part of the publication system 142.

Further, while the client-server-based network architecture 100 shown in FIG. 1 employs a client-server architecture, the present inventive subject matter is, of course, not limited to such an architecture, and could equally well find application in a distributed, or peer-to-peer, architecture system, for example. The various publication system 142, payment system 144, and review system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
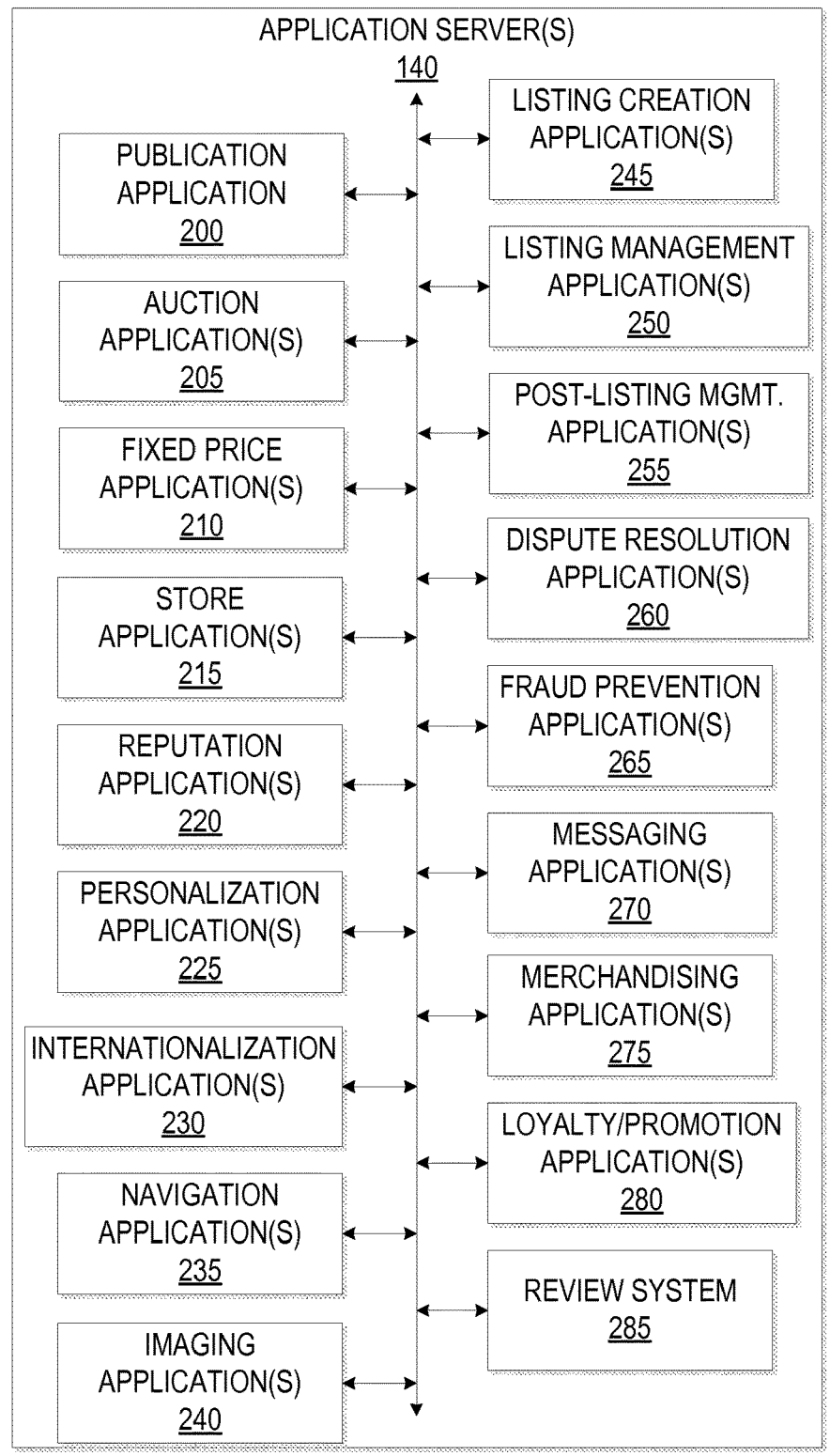
FIG. 2 is a block diagram illustrating various applications that, in one example embodiment, are provided as part of application server(s) in FIG. 1.

FIG. 2 is a block diagram illustrating various applications that, in one example embodiment, are provided as part of application server(s) 140 in FIG. 1. The applications may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The application server(s) 140 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the applications are shown to include at least one publication application 200 and one or more auction applications 205, which support auction-format listing and price setting mechanisms (e.g., English, Dutch, Vickrey, Chinese, Double, Reverse auctions, etc.). The various auction applications 205 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price application(s) 210 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store application(s) 215 allow a seller to group listings within a "virtual" store, which may be branded and otherwise personalized by and for the seller. Such a virtual store may also offer promotions, incentives, and features that are specific and personalized to a relevant seller.

Reputation application(s) 220 allow users 106 who transact to establish, build, and maintain reputations, which may be made available and published to potential trading partners. Consider that where, for example, the application server(s) 140 supports person-to-person trading, users 106 may otherwise have no history or other reference information whereby the trustworthiness and credibility of potential trading partners may be assessed. The reputation application(s) 220 allow a user 106 (for example, through feedback provided by other transaction partners) to establish a reputation over time. Other potential trading partners may then reference such a reputation for the purposes of assessing credibility and trustworthiness.

Personalization application(s) 225 allow users 106 to personalize various aspects of their interactions. For example, a user 106 may, utilizing an appropriate personalization application 225, create a personalized reference page at which information regarding transactions to which the user 106 is (or has been) a party may be viewed. Further, a personalization application 225 may enable a user 106 to personalize listings and other aspects of their interactions with the application server(s) 140 and other parties.

The application server(s) 140 may support a number of marketplaces that are customized, for example, for specific geographic regions. A version may be customized for the United Kingdom, whereas another version may be customized for the United States. Each of these versions may operate as an independent marketplace or may be customized (or internationalized) presentations of a common underlying marketplace. The application server(s) 140 may accordingly include a number of internationalization application(s) 230 that customize information (and/or the presentation of information) according to predetermined criteria (e.g., geographic, demographic or marketplace criteria). For example, the internationalization application(s) 230 may be used to support the customization of information for a number of regional websites that are accessible via respective web servers 122.

Navigation may be facilitated by one or more navigation application(s) 235. For example, a search application (as an example of a navigation application 235) may enable key word searches of listings published. A browse application may allow users 106 to browse various category, catalogue, or inventory data structures according to which listings may be classified. Various other navigation applications 235 may be provided to supplement the search and browse applications.

In order to make available listings as visually informing and attractive as possible, the applications may include one or more imaging application(s) 240, which users 106 may utilize to upload images for inclusion within listings. An imaging application 240 also operates to incorporate images within viewed listings. The imaging application(s) 240 may also support one or more promotional features, such as image galleries that are presented to potential buyers. For example, sellers may pay an additional fee to have an image included within a gallery of images for promoted items.

Listing creation application(s) 245 allow sellers to conveniently author listings pertaining to goods or services that they wish to transact, and listing management application(s) 250 allow sellers to manage such listings. Specifically, where a particular seller has authored and/or published a large number of listings, the management of such listings may present a challenge. The listing management applications 250 provide a number of features (e.g., auto-relisting, inventory level monitors, etc.) to assist the seller in managing such listings. One or more post-listing management applications 255 also assist sellers with a number of activities that typically occur post-listing. For example, upon completion of an auction facilitated by one or more auction applications 205, a seller may wish to leave feedback regarding a particular buyer. To this end, a post-listing management application 255 may provide an interface to one or more reputation applications 220, so as to allow the seller to conveniently provide feedback regarding multiple buyers to the reputation applications 220.

Dispute resolution applications 260 provide mechanisms whereby disputes arising between transacting parties may be resolved. For example, the dispute resolution applications 260 may provide guided procedures whereby the parties are guided through a number of steps in an attempt to settle a dispute. In the event that the dispute cannot be settled via the guided procedures, the dispute may be escalated to a third-party mediator or arbitrator.

A number of fraud prevention application(s) 265 implement fraud detection and prevention mechanisms to reduce the occurrence of fraud.

Messaging application(s) 270 are responsible for the generation and delivery of messages to users 106 (such as, for example, messages advising users 106 regarding the status of listings (e.g., providing "outbid" notices to bidders during an auction process, providing promotional and merchandising information to users 106, or, as will be described later, requesting that a buyer review an item)). Respective messaging application(s) 270 may utilize any one of a number of message delivery networks and platforms to deliver messages to users 106. For example, messaging applications 270 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks.

Merchandising application(s) 275 support various merchandising functions that are made available to sellers to enable sellers to increase sales. The merchandising application(s) 275 also operate the various merchandising features that may be invoked by sellers, and may monitor and track the success of merchandising strategies employed by sellers.

The application server(s) 140 itself, or one or more parties that transact with the application server(s) 140, may operate loyalty programs that are supported by one or more loyalty/promotion applications 280. For example, a buyer may earn loyalty or promotion points for each transaction established and/or concluded with a particular seller, and be offered a reward for which accumulated loyalty points can be redeemed.

A review system 285 may provide a mechanism for buyers to provide reviews of items sold or for sale in the various listings. As will be described in more detail below, this may include a mechanism to generate or retrieve predefined comments so as to ease the burden on the buyer to create comments for the review.

Figure 3:
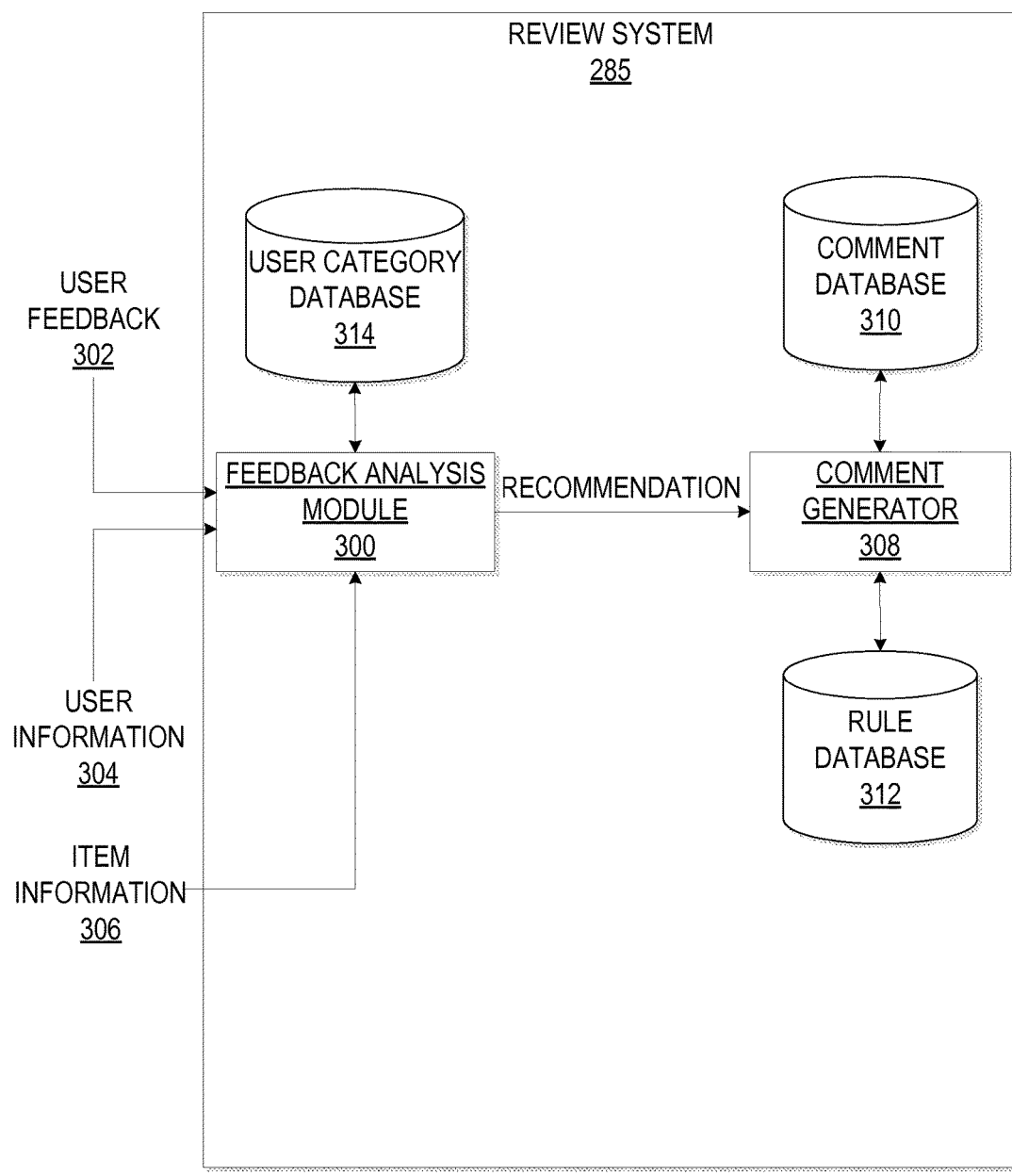
FIG. 3 is a block diagram illustrating the review system in more detail, in accordance with an example embodiment.

FIG. 3 is a block diagram illustrating the review system 285 in more detail, in accordance with an example embodiment. The review system 285 includes a feedback analysis module 300. In an example embodiment, the feedback analysis module 300 acts to analyze user feedback 302 from a buyer as well as additional information such as user information 304 and item information 306 and provide a recommendation to a comment generator 308. The feedback 302, for example, may include some indication of the user 106's happiness or unhappiness with the item, such as a general star rating (e.g., 4 stars) from the user 106. The comment generator 308 then dynamically creates comments for a review based on the recommendation from the feedback analysis module 300. The comment generator 308 may perform this by accessing a number of predefined comments from a comment database 310 and selecting certain predefined comments based on the recommendation from the feedback analysis module 300. Alternatively, or in conjunction with selecting from among predefined comments in the comment database 310, the comment generator 308 also may generate comments from scratch based on one or more rules stored in a rule database 312. Thus, for example, based on the fact that the user 106 indicates a 4-star rating for the item, the comment generator 308 could select or generate appropriate comments consistent with the provided rating (e.g., "This camera is awesome," "This camera is awful," etc.).

As stated above, the feedback analysis module 300 may also consider user information 304 in making its recommendation. This may include information gleaned from a user profile or similar data structure, such as gender, age, location, interests, education, profession, etc. This may also include information gleaned from usage history, such as previous transactions and previous reviews/comments. The comment generator 308 then bases the generation or retrieval of the comments on the recommendation which was based on this user information 304. Thus, the comment generator 308 may generate or retrieve different comments for the same feedback 302 based on differences between users 106. For example, it may be assumed that a male may wish to provide different types of comments about a woman's blouse than a female would. Likewise, factors such as age, location, interests, education, and profession may all indicate that different types of comments should be generated or retrieved for a particular user 106. As an example, a 20 year old male college student majoring in electrical engineering may desire to make comments on a digital camera that are more geared towards the technological aspects of the digital camera (e.g., availability of advanced features, megapixels captured, data storage, etc.) than a 70 year old female retired schoolteacher (e.g., ease of use, attractiveness of the camera itself). By utilizing user information 304 in its analysis, the feedback analysis module 300 is able to recommend that the comment generator 308 generate or retrieve comments that are more likely to be appropriate for the individual buyer, and thus are less likely to be overruled or altered by the buyer before posting.

Usage history may also be relevant to a determination about the "type" of buyer the user 106 is, and thus aid in providing an accurate recommendation for comments in the review. A user 106 who, for example, has a history of purchasing electronic devices may be more likely to focus on technical features in any comments in a review, whereas a user 106 who has never purchased an electronic device may be more focused on ease of use or desirability as a gift.

As stated above, the feedback analysis module 300 may also consider item information 306 in making its recommendation. Item information 306 may include item attributes, such as product specifications (dimensions, features, color, etc.). Item information 306 could also include item category (e.g., electronics, clothing, etc.). Item information 306 could also include less fixed attributes such as item popularity (e.g., number of page views, number of bidders in the case of an auction, etc.).

In an example embodiment, item attributes may be automatically generated by parsing textual description(s) of the item. For example, a seller may write a paragraph describing the item and a natural language parser may parse the paragraph and extract text describing item attributes using one or more natural language processing rules. In another example embodiment, the item attributes may be specified explicitly in an item listing, such as in a structured text portion of an item listing (where a seller was prompted for individual attributes when listing the item). In another example embodiment, an external database could be queried using an item identification (e.g., barcode identification, model number, etc.) to obtain item attributes.

Regardless of how the item attributes are obtained, in an example embodiment the feedback analysis module 300 may undertake an analysis of the item attributes and make a determination of the attribute or attributes that are most important to this particular buyer. This may be in lieu of or in addition to the analysis of the feedback 302 and/or user information 304 as described earlier. Thus, it may be determined, for example, that a user 106 who has given a rating to a digital camera and who also has user information 304 that indicates that the user 106 is a technophile may be most interested in some of the technical features of the item, and thus the feedback analysis module 300 can locate the item attributes that are "most technical" and recommend that the comments be generated around that feature or features. Thus, for example, if the item is a digital camera, the feedback analysis module 300 may recommend that comments be generated around the megapixel count. In some example embodiments, the feedback analysis module 300 may take this a step further and identify "key" attributes of an item. In one example, a "key" attribute is a feature that has been identified by the manufacturer or seller as being an attribute that differentiates the item from competition. In some examples this may be a new or improved feature of the item. It may therefore be assumed that a user 106 may be more likely to want to comment on that key attribute when submitting a review.

Figure 4:
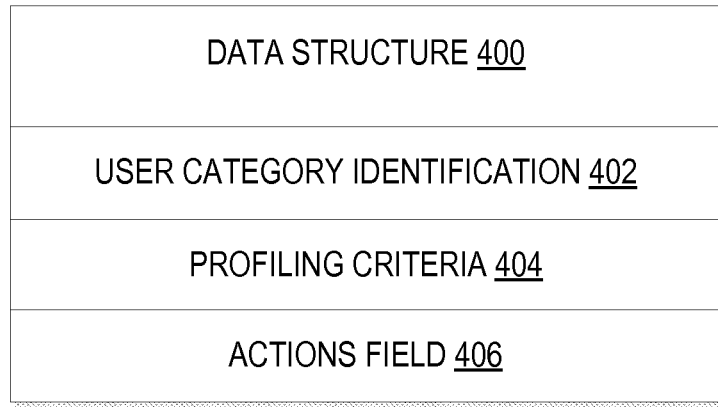
FIG. 4 is a diagram illustrating a data structure for a user category in accordance with an example embodiment.

As part of this process, the feedback analysis module 300 may classify the user 106 into one of various user categories that might help in determining which comments to generate or retrieve. The various user categories may be defined in a user category database 314. In an example embodiment, the user category database 314 may store a data structure for each user category. FIG. 4 is a diagram illustrating a data structure 400 for a user category in accordance with an example embodiment. The data structure 400 may include a user category identification 402. The user category identification 402 may be either textual (e.g, "technophile") or numeric (e.g., "12432) or any combination of the two. The data structure 400 may also include a set of profiling criteria 404. The profiling criteria 404 may indicate ways in which the feedback analysis module 300 can use to determine whether a buyer fits into the corresponding user category. The profiling criteria 404 may include, for example, a set of pieces of user information 304 and values or ranges for each those pieces of user information 304. For example, a profiling criteria 404 for a technophile may specify that if a user 106 has an explicit interest in technology listed in a user profile or has 5 or more electronics purchases in the last year or has a certain combination of demographic information (e.g. sex, age, location) or has a particular educational background then the user 106 should be classified as a technophile. The data structure 400 may also include an actions field 406. The actions field 406 may indicate which action(s), if any, the feedback analysis module 300 should perform when a buyer is classified in the corresponding user category. The actions may include, for example, an identification of key item attributes that the user 106 would likely focus on in a review, or an identification of particular vernacular, slang or regional language variations the user 106 might use in a review (e.g., "this camera is wicked awesome").

Figure 5:
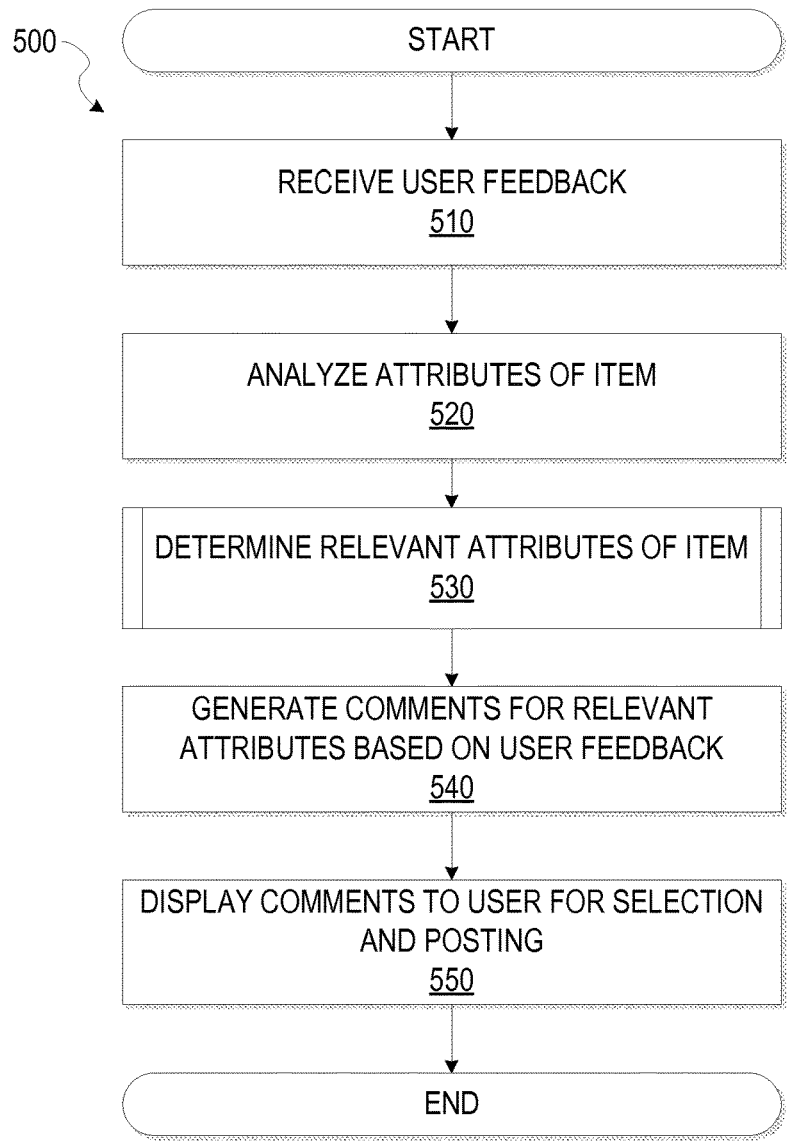
FIG. 5 is a flow diagram illustrating a method of dynamically generating comments for a review of an item in accordance with an example embodiment.

FIG. 5 is a flow diagram illustrating a method 500 of dynamically generating comments for a review of an item in accordance with an example embodiment. At operation 510, user feedback 302 may be received. As described earlier, this user feedback 302 may be limited in order to reduce the burden on the user 106 in creating a review. In an example embodiment, the user feedback 302 may be a single rating, such as a star rating, indicating the overall satisfaction with the item. In another example embodiment, the user feedback 302 may be a series of ratings indicating satisfaction in several specific categories (e.g, ease of use, functionality, aesthetics, etc.).

At operation 520, attributes of the item may be analyzed. As described earlier, this may be performed in a number of different ways. In one example embodiment, an item listing may explicitly provide details about attributes (in addition to the details of the item pertaining to those attributes) in the form of metadata. For example, an item listing may have a specific field called "megapixel count" and the metadata accompanying the item listing may indicate that this field pertains to megapixel count of a digital camera and also indicate that this represents a technical attribute of the item. Alternatively, the item listing may have a specific field called "color" and the metadata accompanying the item listing may indicate that this field pertains to the color of the item and also indicate that this represents an aesthetic attribute of the item. If such attribute information is explicitly provided, operation 520 may involve utilizing such attribute information. If such attribute information is not explicitly provided, however, operation 520 may involve deducing such attribute information through various means, such as by parsing text of an item listing and accessing item categorization information to identify common attributes of items in particular categories. For example, even if the item listing itself does not contain a specific listing for megapixel count, operation 520 may identify that the item is a digital camera and then retrieve a list of common attributes of digital cameras, which may include megapixel count. It may then parse the item listing looking for information that may pertain to megapixel count. The output of operation 520 may be a list of attributes of the item (and possibly also an indication of the type of each attribute, e.g., technical versus aesthetic).

At operation 530, relevant attributes of the item may be determined. This operation will be described in more detail below with respect to FIG. 6. Operation 530 may act to select a certain set of the attributes output by operation 520 and label them as key and/or relevant attributes for a particular userAt operation 540, comments may be dynamically generated for the relevant attributes based on the user feedback 302. As described earlier, the user feedback 302 may indicate the overall impression the user 106 had with regard to the relevant attributes. As such, for example, a five-star rating may cause operation 540 to dynamically generate significantly positive comments for the relevant attributes. Likewise, a one-star rating may cause operation 540 to dynamically generate significantly negative comments for the relevant attributes.

At operation 550, the comments are displayed to the user 106 for selection and posting.

Figure 6:
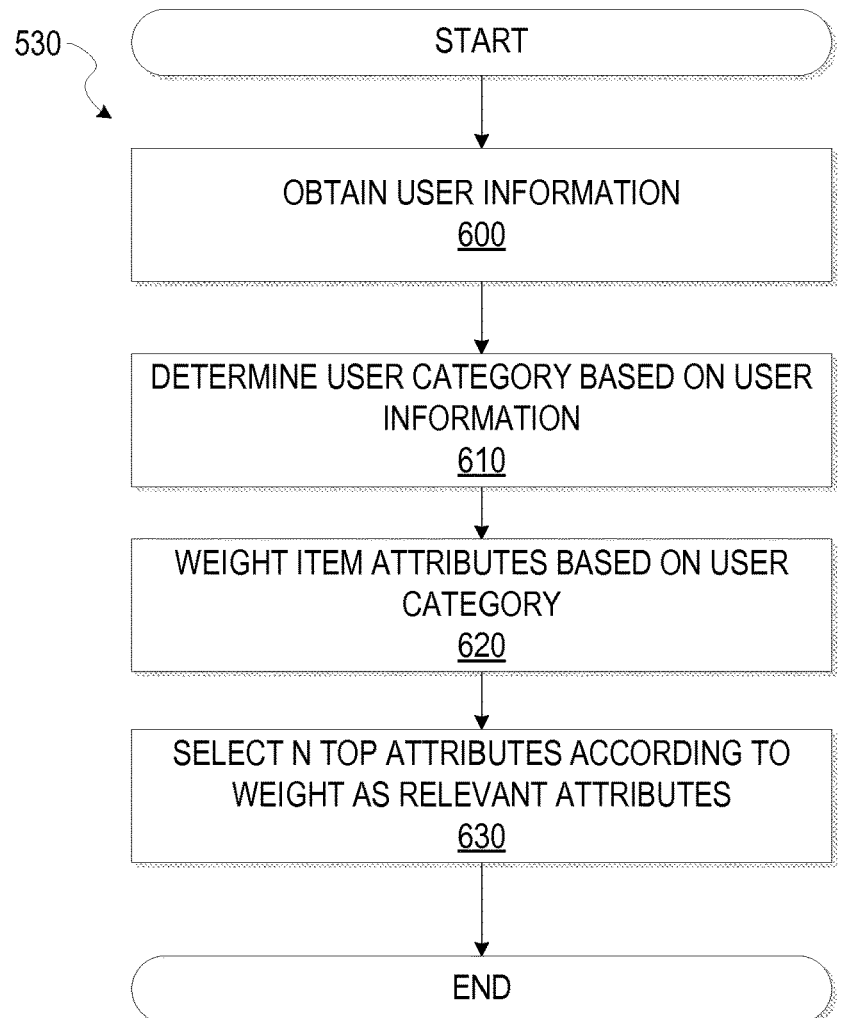
FIG. 6 is a flow diagram illustrating determining relevant attributes of an item in more detail, in accordance with an example embodiment.

FIG. 6 is a flow diagram illustrating determining relevant attributes of an item (operation 530) in more detail, in accordance with an example embodiment. At operation 600, user information 304 may be obtained. As described earlier the user information 304 may include, for example, user profile information and usage information. At operation 610, a user category may be determined based on this user information 304. As described earlier, this may involve accessing a user category database 314 and attempting to match up the user 106 with a user category based on the user information 304. At operation 620, item attributes may be weighted based on the user category. Thus, for example, for certain user categories, certain item attributes (or types of item attributes) can be assigned a higher weight. In an example embodiment, the weighting may also depend on whether or not a particular attribute is a key attribute of the item. A key attribute is an attribute reflecting an important feature of the product. Typically such key attributes will be the few attributes that the majority of buyers would focus on when deciding to purchase the item. For example, in the case of televisions, the fact that the television has 4K resolution would be a key feature, as would the size of the display (e.g., 60-inch). A determination of which attributes are key attributes may be made by deduction from the item listing (e.g., look for the features most talked about in the description) or from third party sources (e.g., look at reviews of the item and see which features are most talked about in reviews). Alternatively, a database may be maintained of the key features of various types of items, and such a database could be queried once the type of the item is known to extract key features. That is, in some embodiments, the key attributes may be the most relevant to one user, but there may also be instances where identified "key" attributes of an item are not the most relevant to another user (e.g., non-technical user may not be interested in exact zoom range or megapixel count).

Then, at operation 630 the n top attributes (according to weight) may be selected as relevant attributes. For example, there may be ten item attributes. These ten item attributes may then be weighted based on the user category. So, for example, if the user category is "technophile" then certain item attributes may be assigned a higher weight. Then, for example, the top two item attributes based on weight can be selected as the relevant attributes, thus producing a set of relevant attributes that varies based on the user category. It should be noted that while operation 620 is depicted as weighting item attributes based on user category, other factors, such as item information 306 (for example item category) may be used in this weighting as well. For example, if the item is determined to be in the digital camera category, certain attributes may be deemed to have higher or lower weight than if the item is in the clothing category. It should also be noted that while the examples herein depict only two prepopulated comments for each user/item combination, one of ordinary skill in the art will recognize that any number of prepopulated comments can be generated or retrieved and displayed to the user for selection.

FIGS. 7-14 are screen captures depicting an example user interface visible to a user 106 while a system is generating comments on his or her behalf. FIGS. 7-14 depict a user interface on a mobile device, but one of ordinary skill in the art will recognize that implementations are possible on different devices, such as laptop or desktop computers through a web browser with altered user interfaces.

Figure 7:
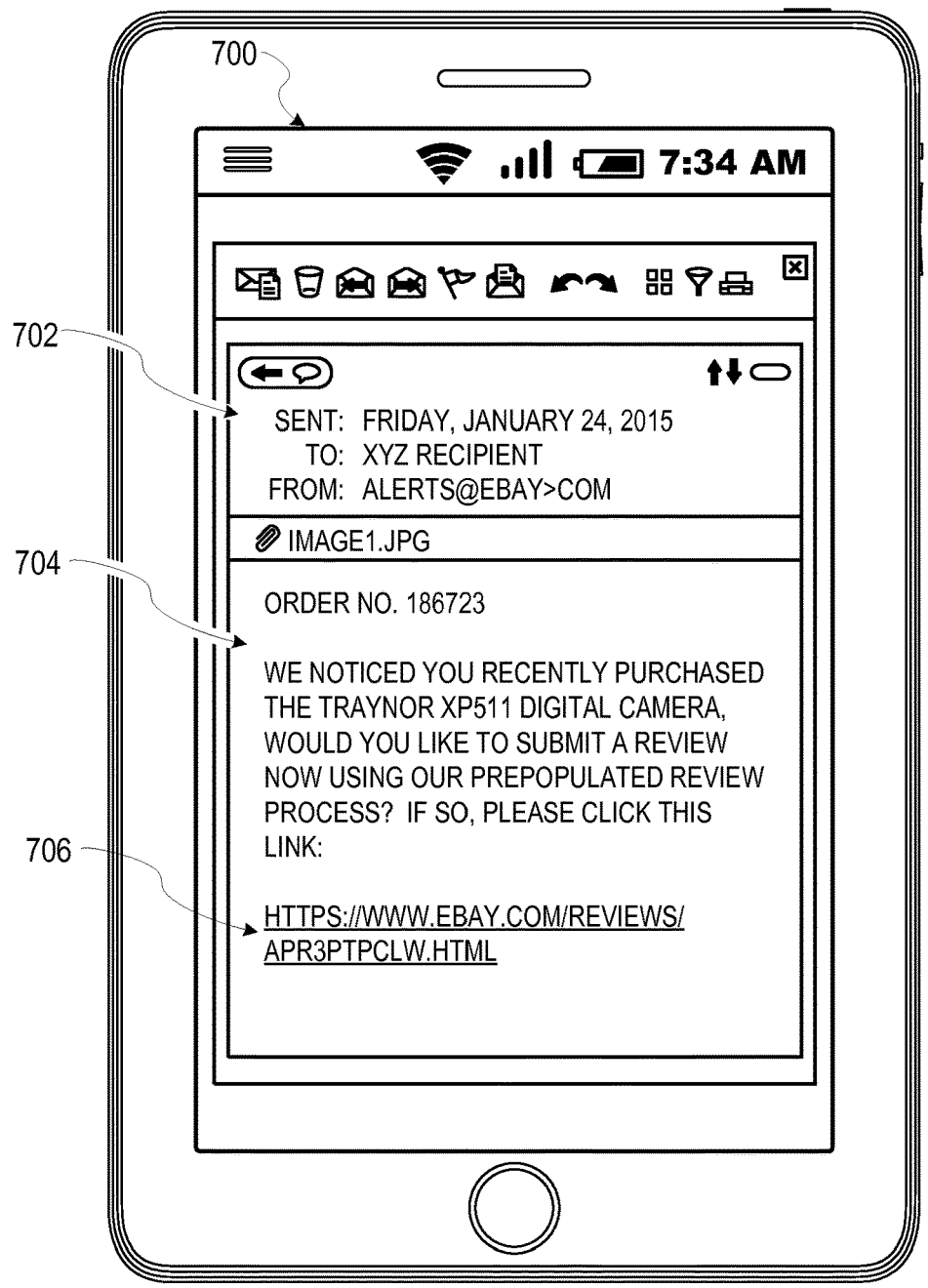
FIG. 7 is a screen capture depicting an example user interface using an email client in accordance with an example embodiment.

FIG. 7 is a screen capture depicting an example user interface 700 using an email client 702 in accordance with an example embodiment. Here, the user interface 700 includes an email client 702 that depicts an email 704. The email 704 indicates that the system recognizes that the user 106 has made a recent purchase and invites the user 106 to submit a review for the purchased item via a prepopulated review process. If the user 106 selects on the link 706 by, for example, tapping the link 706 with his or her finger, the prepopulated review process can begin.

Figure 8:
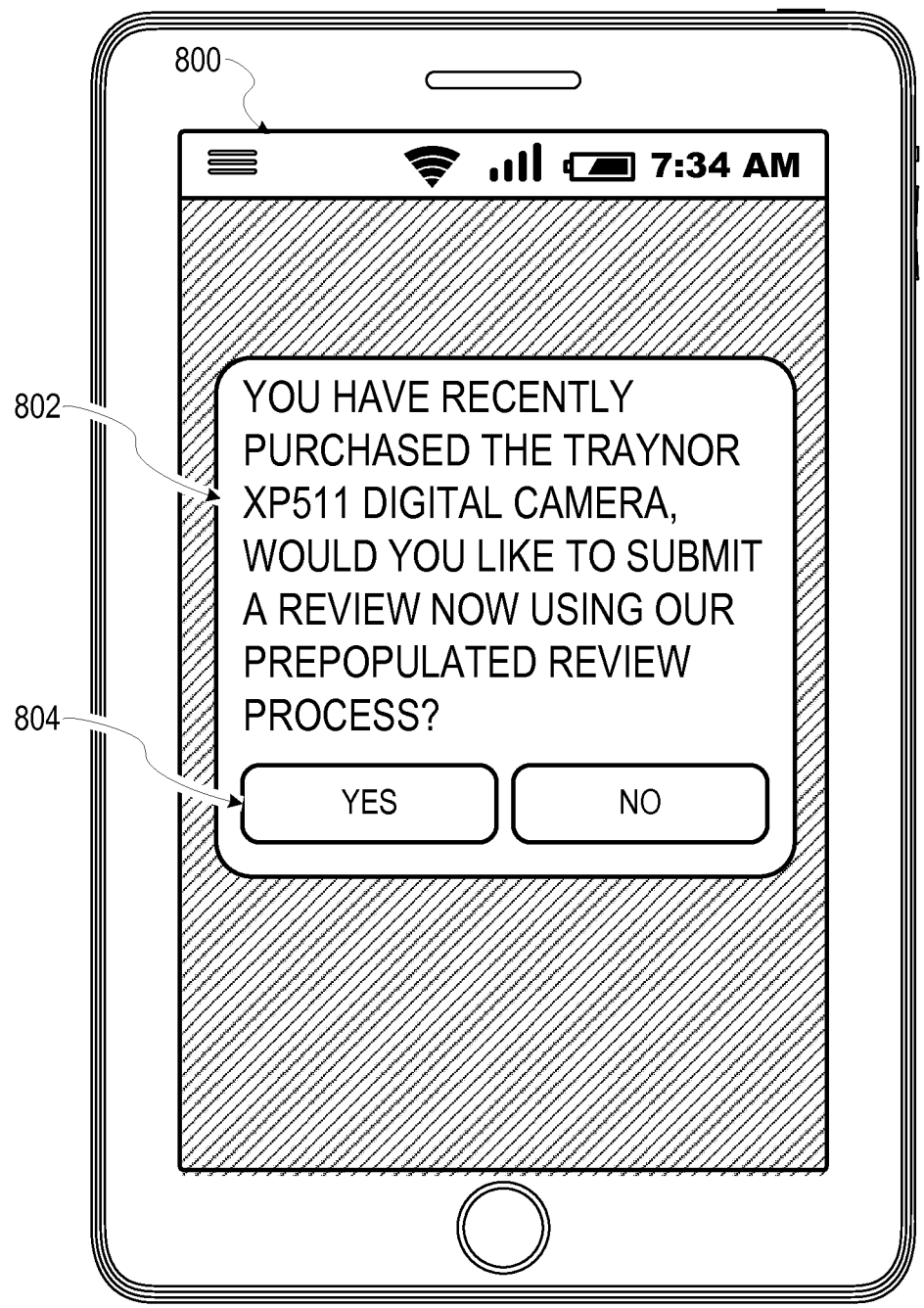
FIG. 8 is a screen capture depicting an alternative user interface for the invitation to submit a review via a prepopulated review process.

FIG. 8 is a screen capture depicting an alternative user interface 800 for the invitation to submit a review via a prepopulated review process. This user interface 800 may be utilized, for example, when the entity running the item listing and/or purchase system has distributed an application 114, which the user 106 has installed on his or her mobile device. In such a case, rather than invite the user 106 to submit the review via email 704, the installed application 114 can launch a notification window 802 containing the invitation. Additionally, rather than using a link to select to begin the prepopulated review process, the user 106 may select a "yes" button 804.

Figure 9:
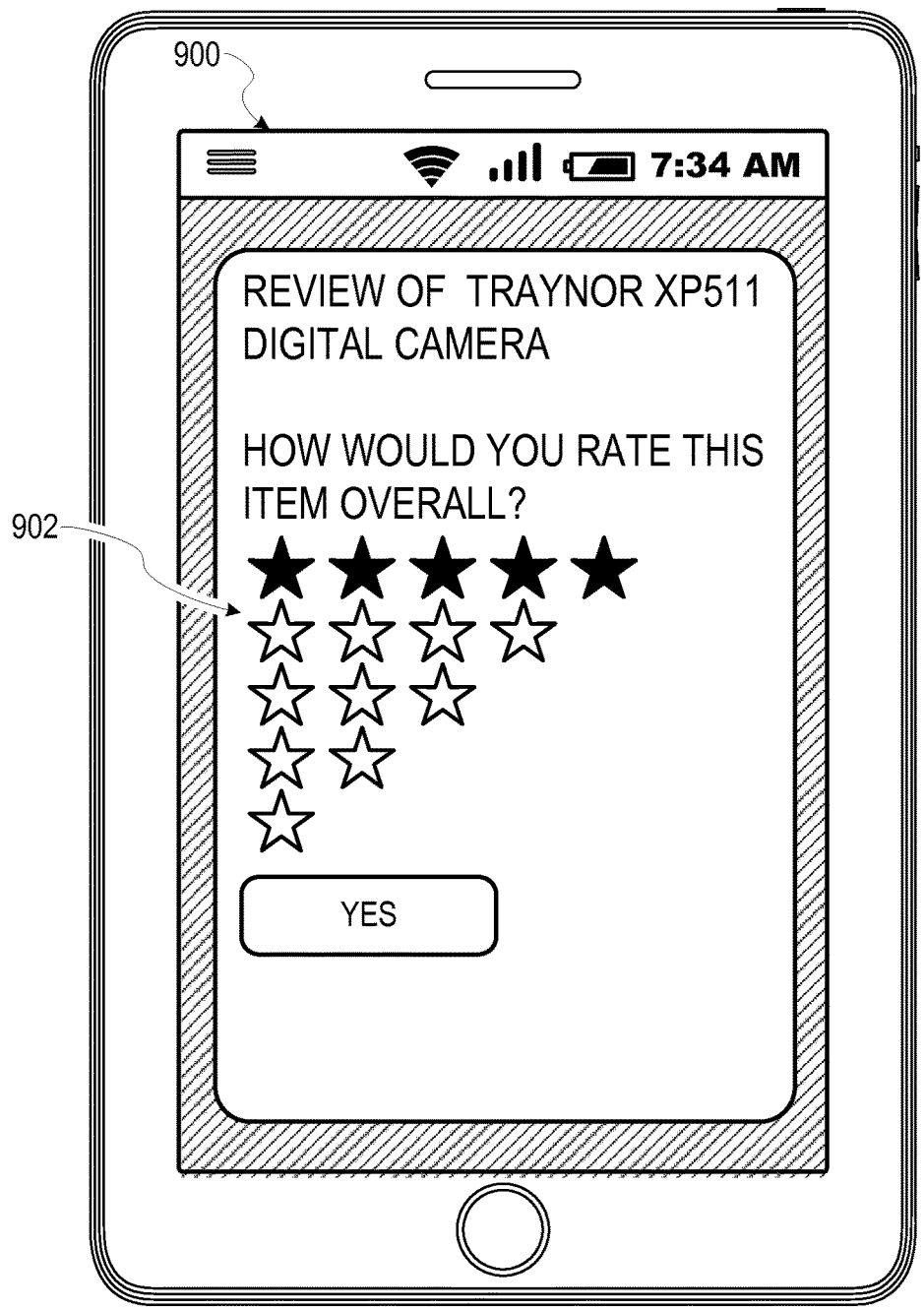
FIG. 9 is a screen capture depicting an example user interface for beginning the prepopulated review process.

Regardless of the mechanism (e.g., either FIG. 7 or FIG. 8) used to invite the user 106 to begin the prepopulated review process, FIG. 9 is a screen capture depicting an example user interface 900 for beginning the prepopulated review process. Here, the user interface 900 asks the user 106 to provide an overall rating of the item by selecting one of five possible ratings 902 (one to five stars). The user 106 may select on one of these five possible ratings 902 to provide user feedback 302 as to the overall satisfaction with the item.

Figure 10:
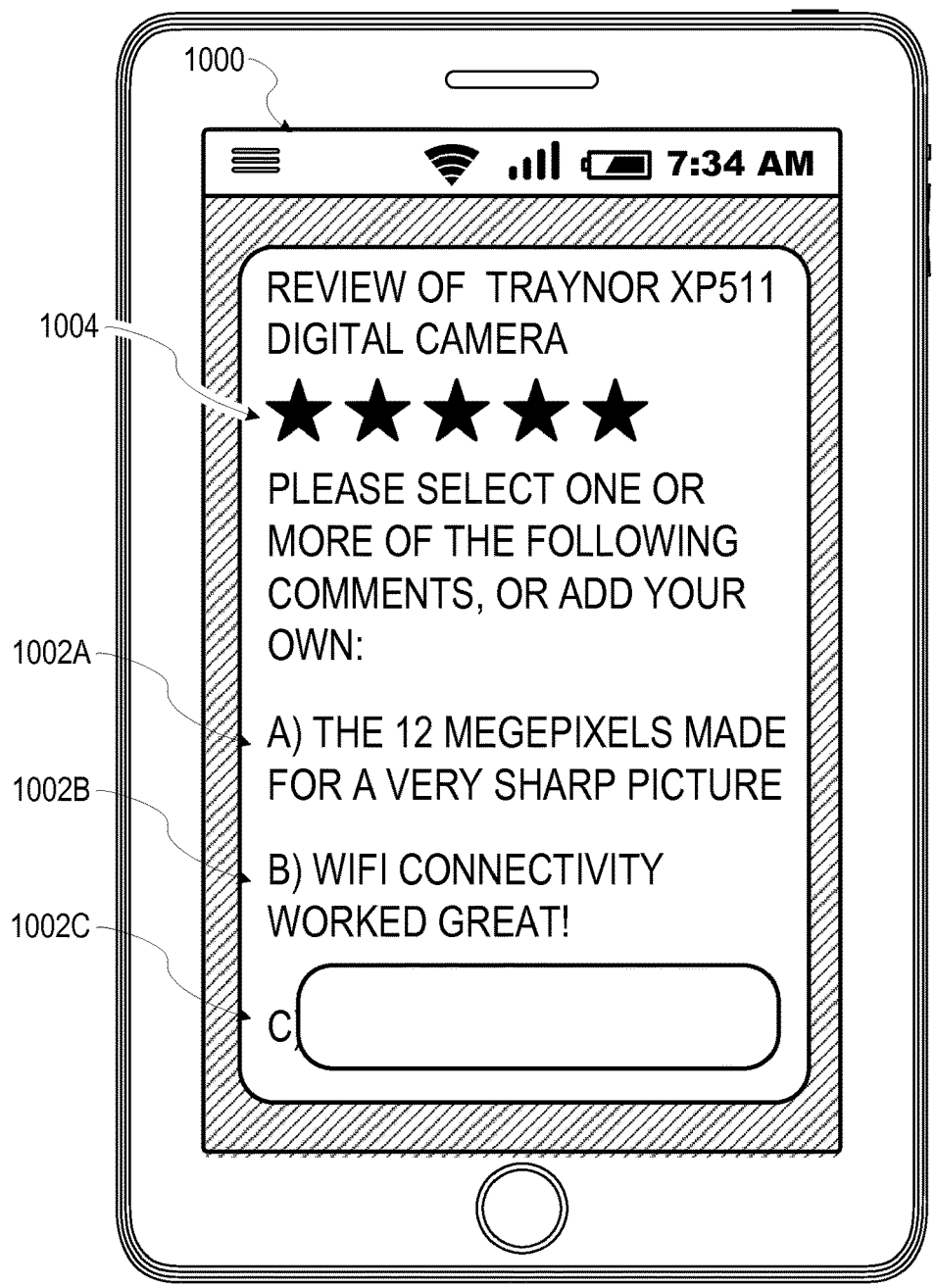
FIG. 10 is a screen capture depicting a user interface presenting prepopulated comments in accordance with an example embodiment.

In response to this, and in accordance with, for example, FIGS. 5 and 6, the user 106 may be presented with one or more prepopulated comments from which to select. These comments may be based, for example, on the user feedback 302 provided in the user interface 900 in FIG. 9 as well as user information 304 and item information 306. Thus, the comments presented may vary greatly depending on the user feedback 302, user information 304, and item information 306. FIG. 10 is a screen capture depicting a user interface 1000 presenting prepopulated comments 1002A-1002B in accordance with an example embodiment. Here, the user 106 has selected a five-star rating for the item, as depicted at 1004. Based on the type of user 106 and the type of the item (digital camera), the system has presented two possible prepopulated comments 1002A-1002B from which the user 106 can select. The user 106 can also enter his or her own comment 1002C should none of the prepopulated comments 1002A-1002B reflect the user 106's position on the item. Notably, the prepopulated comments 1002A-1002B are positive for the attributes involved. These attributes may be the relevant attributes as determined based on the user category and item information 306.

Figure 11:
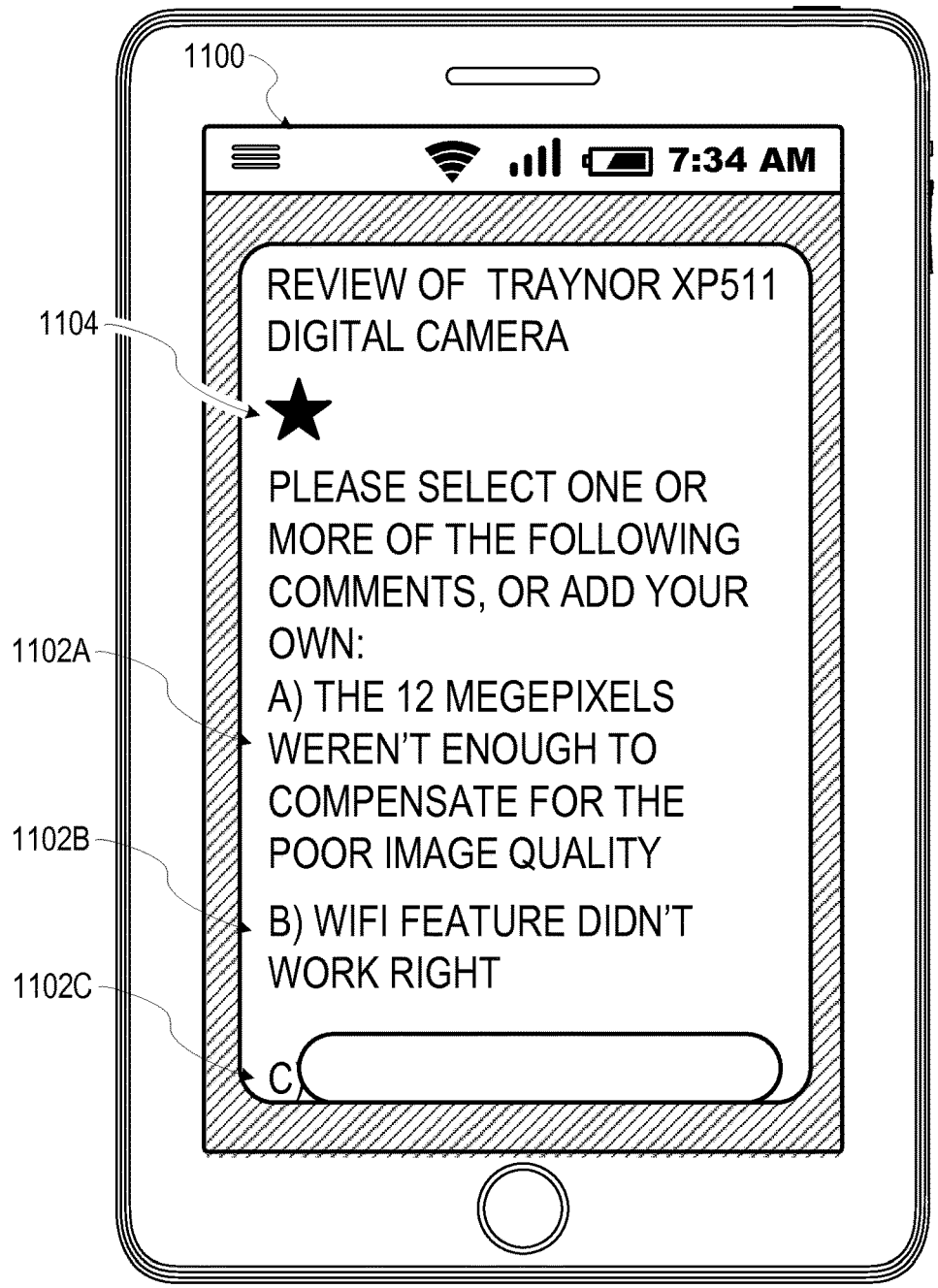
FIG. 11 is a screen capture depicting another user interface presenting prepopulated comments in accordance with an example embodiment.

FIG. 11 is a screen capture depicting another user interface 1100 presenting prepopulated comments 1102A-1102B in accordance with an example embodiment. Here, the user 106 has selected a one-star rating for the item, as depicted at 1104. Based on the type of user 106 and the type of the item (digital camera), the system has presented two possible prepopulated comments 1102A-1102B from which the user 106 can select. The user 106 can also enter his or her own comment 1102C should none of the prepopulated comments 1102A-1102B reflect the user 106's position on the item. Notably, the prepopulated comments 1102A-1102B are negative for the attributes involved. These attributes may be the relevant attributes as determined based on the user category and item information 306.

Figure 12:
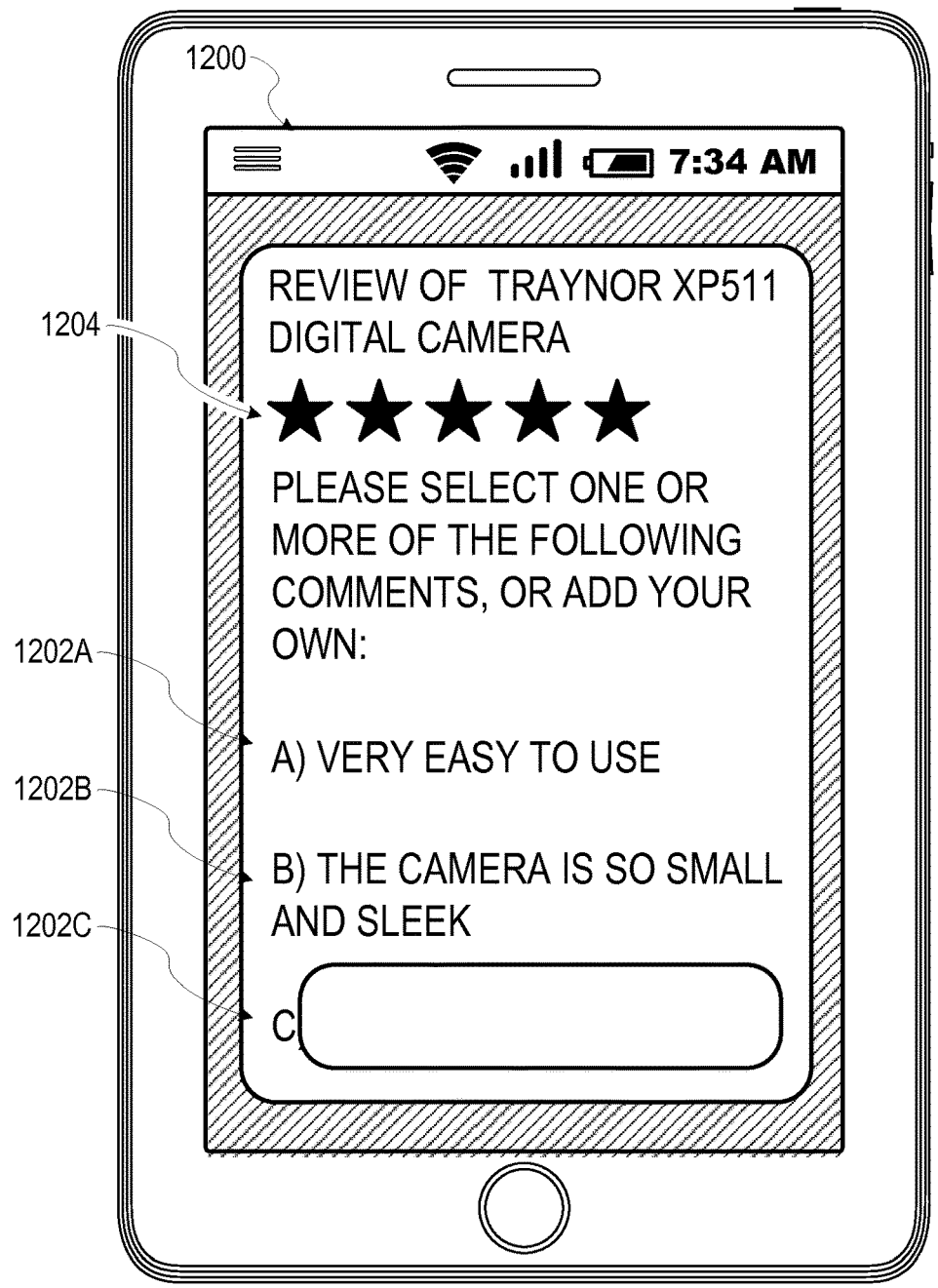
FIG. 12 is a screen capture depicting a user interface presenting prepopulated comments in accordance with an example embodiment.
Figure 13:
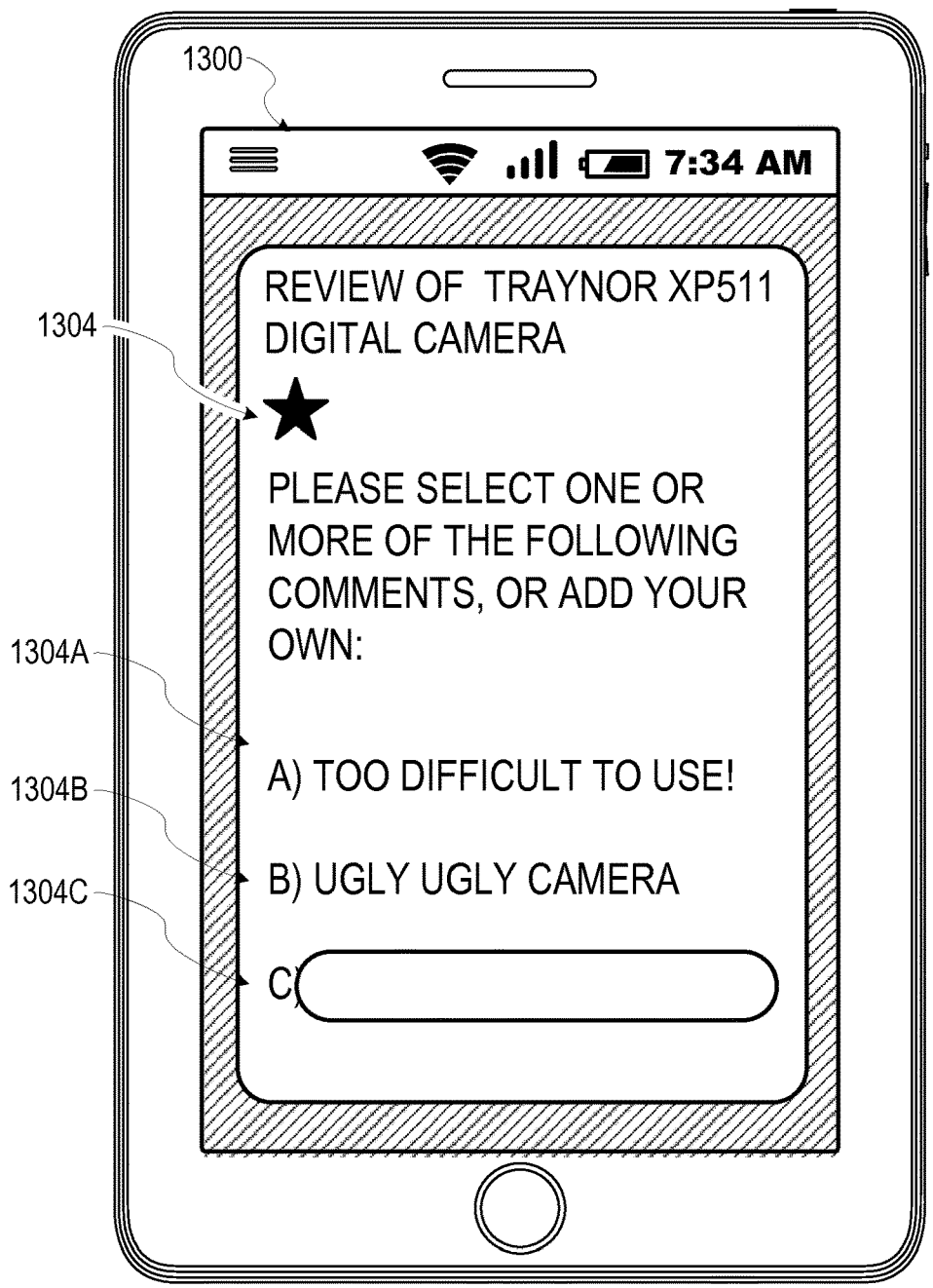
FIG. 13 is a screen capture depicting another user interface presenting prepopulated comments in accordance with an example embodiment.
Figure 14:
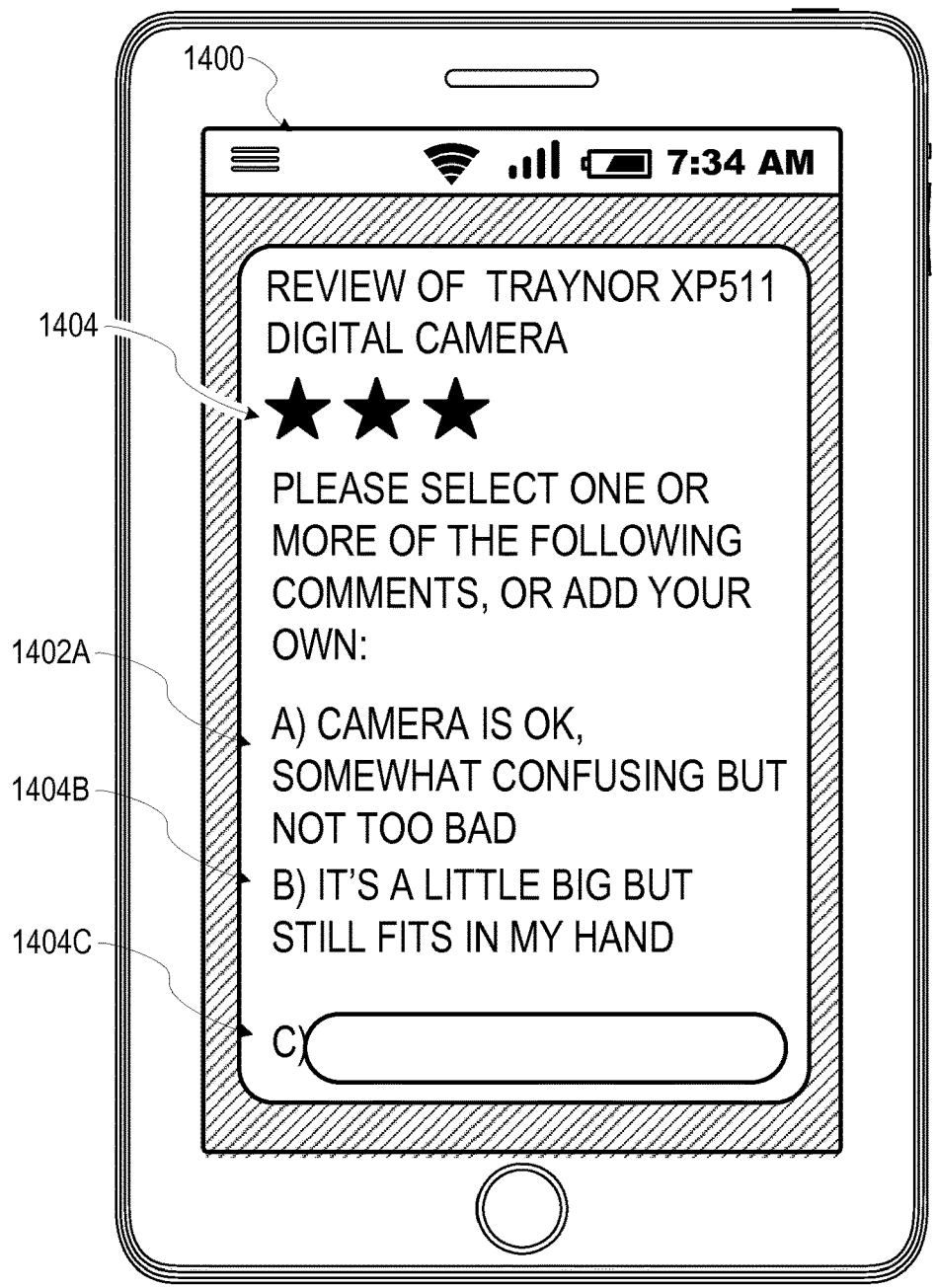
FIG. 14 is a screen capture depicting another user interface presenting prepopulated comments in accordance with an example embodiment.

It should be noted that the prepopulated comments 1002A-1002B, 1102A-1102B in FIGS. 10 and 11 are all geared towards technical features. This may be based in part, for example, on the fact that the user category for this user 106 indicates a leaning towards technical features (e.g., "technophile"). FIGS. 12-14, on the other hand, may be geared towards a user 106 having a user category that leans away from technical features (e.g., "luddite").

FIG. 12 is a screen capture depicting a user interface 1200 presenting prepopulated comments 1202A-1002B in accordance with an example embodiment. Here, the user 106 has selected a five-star rating for the item, as depicted at 1204. Based on the type of user 106 and the type of the item (digital camera), the system has presented two possible prepopulated comments 1202A-1202B from which the user 106 can select. The user 106 can also enter his or her own comment 1202C should none of the prepopulated comments 1202A-1202B reflect the user 106's position on the item. Notably, the prepopulated comments 1202A-1202B are positive for the attributes involved. These attributes may be the relevant attributes as determined based on the user category and item information 306. Notably, the attributes involved are less technical than those suggested in FIG. 10, even though both users 106 selected the same five-star rating for the same item.

FIG. 13 is a screen capture depicting another user interface 1300 presenting prepopulated comments 1304A-1304B in accordance with an example embodiment. Here, the user 106 has selected a one-star rating for the item, as depicted at 1304. Based on the type of user 106 and the type of the item (digital camera), the system has presented two possible prepopulated comments 1304A-1304B from which the user 106 can select. The user 106 can also enter his or her own comment 1304C should none of the prepopulated comments 1302A-1302B reflect the user 106's position on the item. Notably, the prepopulated comments 1304A-1304B are negative for the attributes involved. These attributes may be the relevant attributes as determined based on the user category and item information 306. Notably, the attributes involved are less technical than those suggested in FIG. 11, even though both users 106 selected the same five-star rating for the same item.

FIG. 14 is a screen capture depicting another user interface 1400 presenting prepopulated comments 1402A-1404B in accordance with an example embodiment. Here, the user 106 has selected a three-star rating for the item, as depicted at 1404. Based on the type of user 106 and the type of the item (digital camera), the system has presented two possible prepopulated comments 1402A-1404B from which the user 106 can select. The user 106 can also enter his or her own comment 1404C should none of the prepopulated comments 1402A-1402B reflect the user 106's position on the item. Notably, the prepopulated comments 1402A-1402B are neutral for the attributes involved.

In another example embodiment, the prepopulated comment(s) is/are generated or retrieved without the initial feedback from the user. In such an example embodiment, the system may identify a certain number of relevant attributes and then list a certain number of different potential comments (based on various degrees of satisfaction with the item) for the relevant attributes. For example, if image resolution is determined to be a highly relevant or key attribute, the prepopulated comments generated and presented to the user might include "amazing image resolution, couldn't imagine any sharper image for human eyes," "okay image resolution, better than I expected," and "poor image quality for a camera at this price point."

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-14 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement embodiments of the disclosure in different contexts from the disclosure contained herein.

Software Architecture

Figure 15:
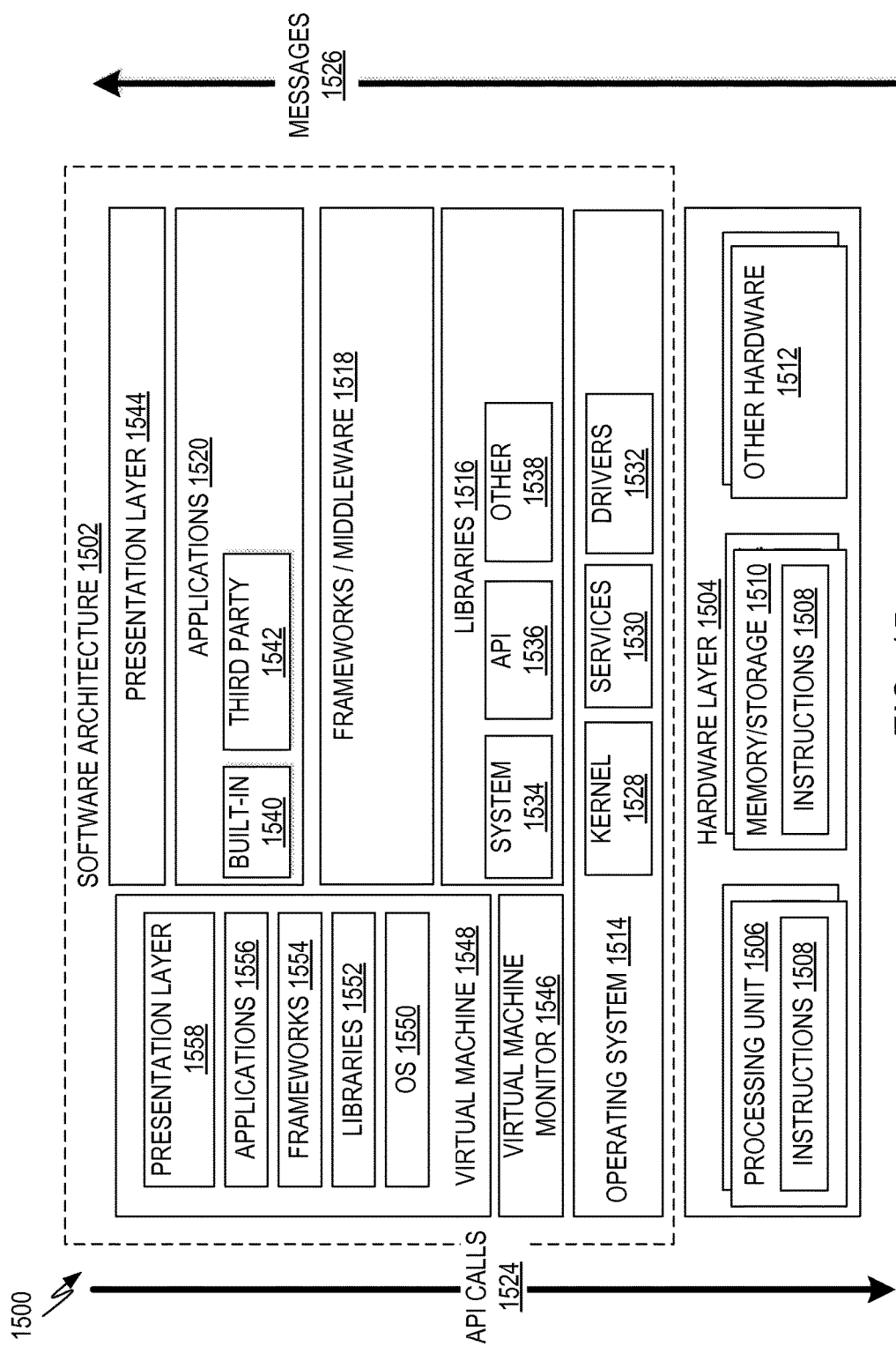
FIG. 15 is a block diagram illustrating an example of a software architecture that may be installed on a machine, according to some example embodiments.

FIG. 15 is a block diagram 1500 illustrating a representative software architecture 1502, which may be used in conjunction with various hardware architectures herein described. FIG. 15 is merely a non-limiting example of a software architecture and it will be appreciated that many other architectures may be implemented to facilitate the functionality described herein. The software architecture 1502 may be executing on hardware such as machine 1600 of FIG. 16 that includes, among other things, processors 1610, memory 1630, and I/O components 1650. A representative hardware layer 1504 is illustrated and can represent, for example, the machine 1600 of FIG. 16. The representative hardware layer 1504 comprises one or more processing units 1506 having associated executable instructions 1508. Executable instructions 1508 represent the executable instructions of the software architecture 1502, including implementation of the methods, modules and so forth of FIGS. 1-14. Hardware layer 1504 also includes memory and/or storage modules 1510, which also have executable instructions 1508. Hardware layer 1504 may also comprise other hardware as indicated by 1512 which represents any other hardware of the hardware layer 1504, such as the other hardware illustrated as part of machine 1600.

In the example architecture of FIG. 15, the software 1502 may be conceptualized as a stack of layers where each layer provides particular functionality. For example, the software 1502 may include layers such as an operating system 1514, libraries 1516, frameworks/middleware 1518, applications 1520 and presentation layer 1544. Operationally, the applications 1520 and/or other components within the layers may invoke application programming interface (API) calls 1524 through the software stack and receive a response, returned values, and so forth illustrated as messages 1526 in response to the API calls 1524. The layers illustrated are representative in nature and not all software architectures 1502 have all layers. For example, some mobile or special purpose operating systems 1514 may not provide a frameworks/middleware layer 1518, while others may provide such a layer. Other software architectures 1502 may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be utilized by the applications 1520 and/or other components and/or layers. The libraries 1516 typically provide functionality that allows other software modules to perform tasks in an easier fashion than to interface directly with the underlying operating system 1514 functionality (e.g., kernel 1528, services 1530 and/or drivers 1532). The libraries 1516 may include system 1534 libraries (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 and/or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 and/or other software components/modules, some of which may be specific to a particular operating system 1514 or platform.

The applications 1520 includes built-in applications 1540 and/or third party applications 1542. Examples of representative built-in applications 1540 may include, but are not limited to, a contacts application, a browser application, a book reader application, a location application, a media application, a messaging application, and/or a game application. Third party applications 1542 may include any of the built in applications 1540 as well as a broad assortment of other applications. In a specific example, the third party application 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1542 may invoke the API calls 1524 provided by the mobile operating system such as operating system 1514 to facilitate functionality described herein.

The applications 1520 may utilize built in operating system functions (e.g., kernel 1528, services 1530 and/or drivers 1532), libraries 1516 (e.g., system 1534, APIs 1536, and other libraries 1538), and frameworks/middleware 1518 to create user interfaces to interact with users 106 of the system. Alternatively, or additionally, in some systems interactions with a user 106 may occur through a presentation layer, such as presentation layer 1544. In these systems, the application/module "logic" can be separated from the aspects of the application/module that interact with a user 106.

Some software architectures 1502 utilize virtual machines. In the example of FIG. 15, this is illustrated by virtual machine 1548. A virtual machine 1548 creates a software environment where applications/modules can execute as if they were executing on a hardware machine (such as the machine of FIG. 16, for example). A virtual machine 1548 is hosted by a host operating system (operating system 1514 in FIG. 16) and typically, although not always, has a virtual machine monitor 1546, which manages the operation of the virtual machine 1548 as well as the interface with the host operating system (i.e., operating system 1514). A software architecture 1502 executes within the virtual machine 1548 such as an operating system 1550, libraries 1552, frameworks/middleware 1518, applications 1556 and/or presentation layer 1558. These layers of software architecture 1502 executing within the virtual machine 1548 can be the same as corresponding layers previously described or may be different.

Example Machine Architecture and Machine-Readable Medium

Figure 16:
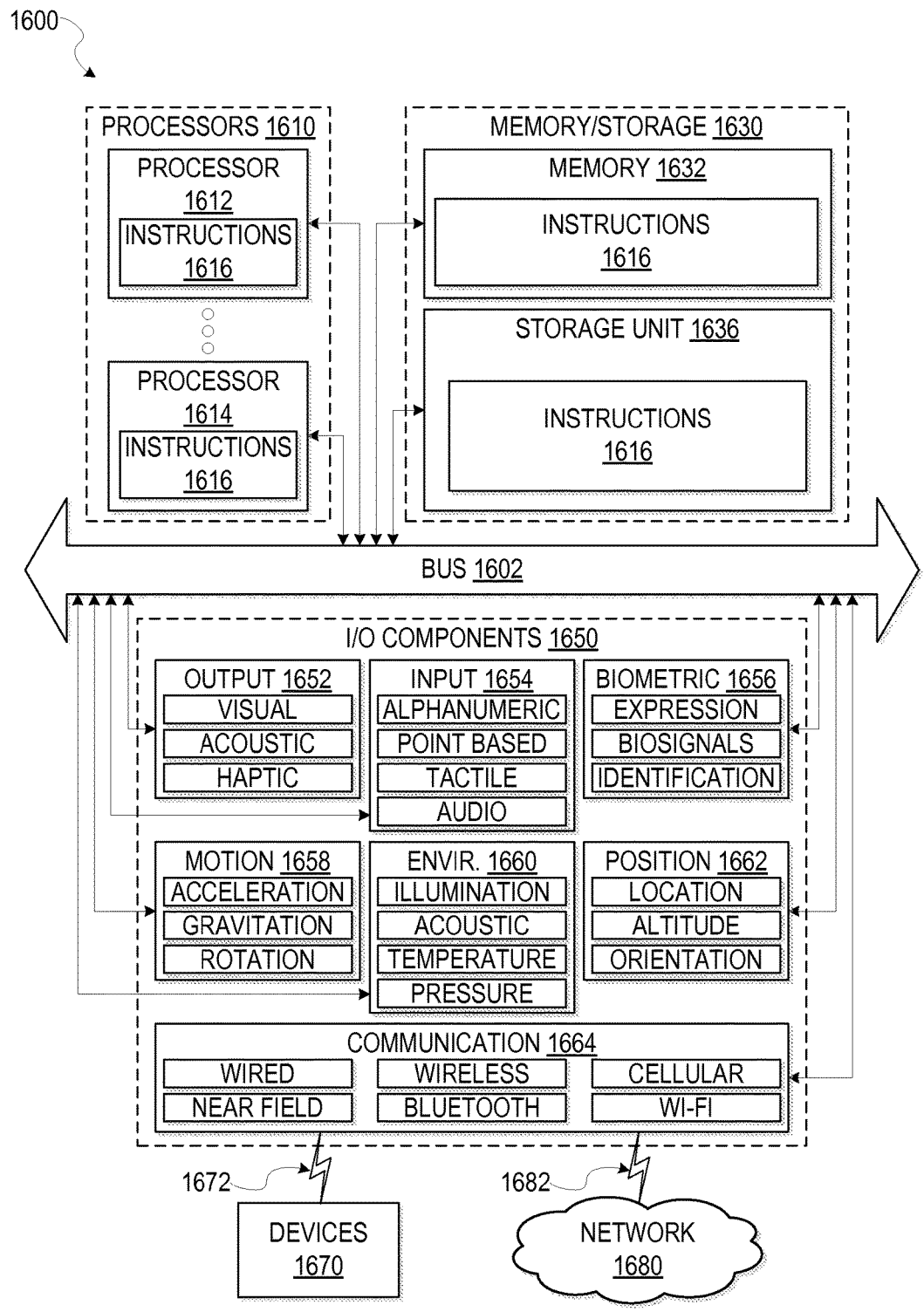
FIG. 16 illustrates a diagrammatic representation of a machine in the form of a computer system within which a set of instructions may be executed for causing the machine to perform any one or more of the methodologies discussed herein, according to an example embodiment.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application 1520, an applet, an app, or other executable code) for causing the machine 1600 to perform any one or more of the methodologies discussed herein may be executed. For example, the instructions 1616 may cause the machine 1600 to execute the flow diagrams of FIGS. 1-14. Additionally, or alternatively, the instructions 1616 may implement various modules of FIGS. 1-14, and so forth. The instructions 1616 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1600 capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1612 and processor 1614 that may execute instructions 1616. The term "processor" is intended to include multi-core processors 1610 that may comprise two or more independent processors 1610 (sometimes referred to as "cores") that may execute instructions 1616 contemporaneously. Although FIG. 16 shows multiple processors, 1610 the machine 1600 may include a single processor 1610 with a single core, a single processor 1610 with multiple cores (e.g., a multi-core processor), multiple processors 1610 with a single core, multiple processors 1610 with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 1632 store the instructions 1616, embodying any one or more of the methodologies or functions described herein. The instructions 1616 may also reside, completely or partially, within the memory 1632, within the storage unit 1636, within at least one of the processors 1610 (e.g., within the processor 1610's cache memory), or any suitable combination thereof, during execution thereof by the machine 1600. Accordingly, the memory 1632, the storage unit 1636, and the memory of processors 1610 are examples of machine-readable media.

As used herein, "machine-readable medium" means a device able to store instructions 1616 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions 1616, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1650 may include a wide variety of components to receive input, provide output, produce output, transmit information, exchange information, capture measurements, and so on. The specific I/O components 1650 that are included in a particular machine 1600 will depend on the type of machine 1600. For example, portable machines 1600 such as mobile phones will likely include a touch input device or other such input mechanisms, while a headless server machine 1600 will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672 respectively. For example, the communication components 1664 may include a network interface component or other suitable device to interface with the network 1680. In further examples, communication components 1664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1670 may be another machine 1600 or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled. As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method comprising:
   causing presentation, within a graphical user interface of a computer system, of a plurality of graphical representations of different visible quantities, the graphical representations being selectable graphical user interface elements;
   receiving non-textual user feedback on a purchased item from a user by detecting user selection, within the graphical user interface, of one of the plurality of graphical representations;
   identifying attributes of the purchased item;
   determining relevant attributes from the attributes, the determination of relevant attributes being based on user information regarding the user;
   obtaining a plurality of potential comments based on the non-textual user feedback, the obtaining including querying a comment database;
   selecting one or more of the plurality of potential comments based on the determined relevant attributes; and
   causing the comments to be displayed, in the graphical user interface, alongside the user selected one of the plurality of graphical representations, to the user for selection and posting, each of the plurality of potential comments being displayed in a separately selectable user interface element.

2. The method of claim 1, the determining comprising:
   obtaining user information regarding the user;
   determining a user category for the user based on the user information;
   weighting the identified attributes based on the user category; and
   selecting n top attributes according to weight as relevant attributes.

3. The method of claim 2, the weighting the identified attributes also being based on item information.

4. The method of claim 3, the item information including an item category.

5. The method of claim 2, the determining the user category including matching the user information to profiling criteria in a data structure corresponding to the user category in a user category database.

6. The method of claim 1, wherein the user feedback includes an overall rating of satisfaction with the purchased item.

7. The method of claim 1, wherein the user feedback includes multiple ratings for specific categories of satisfaction with the purchased item.

8. The method of claim 1, wherein the graphical user interface is displayed on a mobile device having limited screen space.

9. A system comprising:
   a feedback analysis module executable by one or more processors and configured to:
   cause presentation, within a graphical user interface of a computer system, of a plurality of graphical representations of different visible quantities, the graphical representations being selectable graphical user interface elements;
   receive non-textual user feedback on a purchased item from a user by detecting user selection, within the graphical user interface, of one of the plurality of graphical representations;
   identify attributes of the purchased item;
   determine relevant attributes from the attributes, the determination of relevant attributes being based on user information regarding the user;
   a comment generator module executable by one or more processors and configured to:

obtain a plurality of potential comments based on the non-textual user feedback, the obtaining including querying a comment database;
select one or more of the plurality of potential comments based on the determined relevant attributes; and
cause the selected one or more of the plurality of potential comments to be displayed, in the graphical user interface, alongside the user selected one of the plurality of graphical representations, to the user for selection and posting, each of the plurality of potential comments being displayed in a separately selectable user interface element.

10. The system of claim 9, the determining comprising:
obtaining user information regarding the user;
determining a user category for the user based on the user information;
weighting the identified attributes based on the user category; and
selecting the n top attributes according to weight as relevant attributes.

11. The system of claim 10, the weighting of the identified attributes also being based on item information.

12. The system of claim 11, the item information including an item category.

13. The system of claim 10, the determining a user category including matching the user information to profiling criteria in a data structure corresponding to a user category in a user category database.

14. The system of claim 9, wherein the non-textual user feedback includes a rating on a scale from low to high, and wherein the selecting includes selecting a positive comment if the non-textual user feedback is closer to the high of the scale than to the low of the scale.

15. The system of claim 9, wherein the graphical user interface is displayed on a mobile device having limited screen space.

16. A non-transitory machine-readable storage medium comprising instructions, which when implemented by one or more machines, cause the one or more machines to perform operations comprising:
causing presentation, within a graphical user interface of a computer system, of a plurality of graphical representations of different visible quantities, the graphical representations being selectable graphical user interface elements;
receiving non-textual user feedback on a purchased item from a user by detecting selection, within the graphical user interface, of one of the plurality of graphical representations;
identifying attributes of the purchased item;
determining relevant attributes from the attributes, the determination of relevant attributes being based on user information regarding the user;
obtaining a plurality of potential comments based on the non-textual user feedback, the obtaining including querying a comment database;
selecting one or more of the plurality of potential comments based on the determined relevant attributes; and
causing the comments to be displayed, in the graphical user interface, alongside the user selected one of the plurality of graphical representations, to the user for selection and posting; each of the plurality of potential comments being displayed in a separately selectable user interface element.

17. The non-transitory machine-readable storage medium of claim 16, the determining comprising:
obtaining user information regarding the user;
determining a user category for the user based on the user information;
weighting the identified attributes based on the user category; and
selecting the n top attributes according to weight as relevant attributes.

18. The non-transitory machine-readable storage medium of claim 17, the weighting the identified attributes also being based on item information.

19. The non-transitory machine-readable storage medium of claim 18, the item information including item category.

20. The non-transitory machine-readable storage medium of claim 17, the determining the user category including matching the user information to profiling criteria in a data structure corresponding to the user category in a user category database.

21. The non-transitory machine-readable storage medium of claim 16, wherein the user feedback includes an overall rating of satisfaction with the purchased item.

22. The non-transitory machine-readable storage medium of claim 16, wherein the graphical user interface is displayed on a mobile device having limited screen space.

* * * * *

UNITED STATES PATENT AND TRADEMARK OFFICE
CERTIFICATE OF CORRECTION

PATENT NO. : 10,380,656 B2
APPLICATION NO. : 14/633938
DATED : August 13, 2019
INVENTOR(S) : Romi Akpala Page 1 of 1

It is certified that error appears in the above-identified patent and that said Letters Patent is hereby corrected as shown below:

In the Claims

In Column 24, Line 2, Claim 16, after "detecting" insert -- user --.

In Column 24, Line 17, Claim 16, delete "posting;" insert -- posting, --, therefor.

Signed and Sealed this
Twenty-first Day of July, 2020

Andrei Iancu
*Director of the United States Patent and Trademark Office*